United States Patent
Jeong et al.

(10) Patent No.: US 11,253,003 B2
(45) Date of Patent: Feb. 22, 2022

(54) AEROSOL GENERATING DEVICE, METHOD FOR CONTROLLING SAME, AND CHARGING SYSTEM INCLUDING SAME

(71) Applicant: KT&G CORPORATION, Daejeon (KR)

(72) Inventors: Seung Kiu Jeong, Gimhae-si (KR); Joong Hak Kwon, Gimhae-si (KR); In Seong Chun, Goyang-si (KR); Ghi Yuun Kang, Seoul (KR); Jung Ho Han, Yuseong-gu (KR); Jong Sub Lee, Gimhae-si (KR)

(73) Assignee: KT&G CORPORATION, Daejeon (KR)

( * ) Notice: Subject to any disclaimer, the term of this patent is extended or adjusted under 35 U.S.C. 154(b) by 0 days.

(21) Appl. No.: 16/479,117

(22) PCT Filed: Jan. 18, 2018

(86) PCT No.: PCT/KR2018/000871
§ 371 (c)(1),
(2) Date: Jul. 18, 2019

(87) PCT Pub. No.: WO2018/135888
PCT Pub. Date: Jul. 26, 2018

(65) Prior Publication Data
US 2019/0380390 A1    Dec. 19, 2019

(30) Foreign Application Priority Data

Jan. 18, 2017   (KR) .................. 10-2017-0008901
Jan. 18, 2017   (KR) .................. 10-2017-0008904
(Continued)

(51) Int. Cl.
*A24F 40/50*   (2020.01)
*A24F 40/46*   (2020.01)
(Continued)

(52) U.S. Cl.
CPC .............. *A24F 40/50* (2020.01); *A24F 40/46* (2020.01); *A24F 40/51* (2020.01); *A24F 40/57* (2020.01);
(Continued)

(58) Field of Classification Search
CPC ................................ A24F 40/46; A24F 40/51
(Continued)

(56) References Cited

U.S. PATENT DOCUMENTS 5,665,262 A * 9/1997 Hajaligol ................ A24F 40/46
219/553
9,516,899 B2   12/2016 Plojoux et al.
(Continued)

FOREIGN PATENT DOCUMENTS

CN   204483016 U   7/2015
CN   104886775 A   9/2015
(Continued)

OTHER PUBLICATIONS

Office Action for corresponding KR 10-2017-0161440, dated Nov. 18, 2018.
(Continued)

*Primary Examiner* — Eric Yaary
*Assistant Examiner* — Russell E Sparks
(74) *Attorney, Agent, or Firm* — Sughrue Mion, PLLC

(57) ABSTRACT

Provided is an aerosol generating apparatus including: a main body into which a cigarette is inserted; a first electrically conductive pattern provided on a portion of the main body to function as one of a heater for heating the cigarette and a temperature sensor for sensing a temperature of the cigarette; a second electrically conductive pattern provided on another portion of the main body to function as one of the heater and the temperature sensor; and a controller controlling the first electrically conductive pattern and the second
(Continued)

electrically conductive pattern to make the first electrically conductive pattern and the second electrically conductive pattern function as one of the heater and the temperature sensor.

4 Claims, 23 Drawing Sheets

(30) Foreign Application Priority Data

| Jan. 18, 2017 | (KR) | 10-2017-0008905 |
|---|---|---|
| May 11, 2017 | (KR) | 10-2017-0058772 |
| May 11, 2017 | (KR) | 10-2017-0058775 |
| May 11, 2017 | (KR) | 10-2017-0058776 |
| Nov. 6, 2017 | (KR) | 10-2017-0146951 |
| Nov. 29, 2017 | (KR) | 10-2017-0161440 |
| Jan. 18, 2018 | (KR) | 10-2018-0006556 |
| Jan. 18, 2018 | (KR) | 10-2018-0006559 |
| Jan. 18, 2018 | (KR) | 10-2018-0006560 |

(51) Int. Cl.
| A24F 40/51 | (2020.01) |
|---|---|
| A24F 40/57 | (2020.01) |
| H02J 7/00 | (2006.01) |
| A24F 40/90 | (2020.01) |
| A24F 40/95 | (2020.01) |
| A24F 40/20 | (2020.01) |
| A24F 40/85 | (2020.01) |

(52) U.S. Cl.
CPC ............. *A24F 40/90* (2020.01); *A24F 40/95* (2020.01); *H02J 7/0044* (2013.01); *A24F 40/20* (2020.01); *A24F 40/85* (2020.01)

(58) Field of Classification Search
USPC ........................................................ 131/328
See application file for complete search history.

(56) References Cited

U.S. PATENT DOCUMENTS

| 9,655,383 | B2 | 5/2017 | Holzherr et al. | |
|---|---|---|---|---|
| 9,674,894 | B2 | 6/2017 | Schneider et al. | |
| 9,854,844 | B2 | 1/2018 | Plojoux et al. | |
| 10,117,460 | B2 | 11/2018 | Sears et al. | |
| 10,333,330 | B2 | 6/2019 | Holzherr | |
| 10,477,897 | B2 * | 11/2019 | Schlipf | A24F 47/008 |
| 10,548,350 | B2 | 2/2020 | Greim et al. | |
| 2006/0196518 | A1 * | 9/2006 | Hon | H05B 1/0202 |
| | | | | 131/360 |
| 2009/0039073 | A1 * | 2/2009 | Guo | G05D 23/2401 |
| | | | | 219/494 |
| 2014/0305449 | A1 | 10/2014 | Plojoux et al. | |
| 2014/0345606 | A1 | 11/2014 | Talon | |
| 2014/0363145 | A1 | 12/2014 | Plojoux et al. | |
| 2015/0020832 | A1 | 1/2015 | Greim et al. | |
| 2015/0245666 | A1 | 9/2015 | Memari et al. | |
| 2015/0296885 | A1 | 10/2015 | Liu | |
| 2015/0359263 | A1 * | 12/2015 | Bellinger | A24F 40/51 |
| | | | | 392/394 |
| 2015/0380355 | A1 | 12/2015 | Rogers et al. | |
| 2016/0366946 | A1 | 12/2016 | Murison et al. | |
| 2017/0027221 | A1 | 2/2017 | Liu | |
| 2017/0119051 | A1 * | 5/2017 | Blandino | H05B 3/0014 |

FOREIGN PATENT DOCUMENTS

| DE | 202016100917 U1 | 3/2016 |
|---|---|---|
| EP | 2316286 A1 | 5/2011 |
| EP | 3248485 B1 | 4/2020 |
| JP | 5-114460 A | 5/1993 |
| JP | 2013-509160 A | 3/2013 |
| JP | 2015-506170 A | 3/2015 |
| JP | 2015-508996 A | 3/2015 |
| JP | 2015-204833 A | 11/2015 |
| KR | 10-0636287 B1 | 10/2006 |
| KR | 20-2011-0003499 U | 4/2011 |
| KR | 10-2012-0101637 A | 9/2012 |
| KR | 10-2015-0014535 A | 2/2015 |
| KR | 10-2015-0064754 A | 6/2015 |
| KR | 20-0479425 Y1 | 1/2016 |
| KR | 10-1619032 B1 | 5/2016 |
| KR | 10-2016-0114743 A | 10/2016 |
| KR | 10-2016-0129015 A | 11/2016 |
| KR | 10-2016-0129024 A | 11/2016 |
| KR | 10-2016-0133665 A | 11/2016 |
| KR | 10-2016-0147253 A | 12/2016 |
| WO | 2011/050964 A1 | 5/2011 |
| WO | 2016/107766 A1 | 7/2016 |
| WO | 2018/202732 A1 | 11/2018 |

OTHER PUBLICATIONS

Notice of Allowance for corresponding KR 10-2017-0161440, dated May 28, 2019.
International Search Report for PCT/KR2018/000871, dated May 29, 2018.
Partial Supplementary European Search Report dated Sep. 17, 2020 from the European Patent Office in Application No. 18741016.2.
Extended European Search Report dated Sep. 18, 2020 from the European Patent Office in Application No. 20188936.7.
Notification of Reasons for Refusal dated May 12, 2020, from the Korean Intellectual Property Office in Application No. 10-2018-0006556.
Notification of Reasons for Refusal dated May 14, 2020, from the Korean Intellectual Property Office in Application No. 10-2018-0006559.
Notification of Reasons for Refusal dated May 14, 2020, from the Korean Intellectual Property Office in Application No. 10-2018-0006560.
Communication dated Nov. 26, 2020, issued by the Korean Intellectual Property Office in application No. 10-2018-0006559.
Communication dated Jan. 5, 2021, issued by the Japanese Patent Office in application No. 2019-559253.
The Extended European Search Report dated Jan. 11, 2021, issued by the European Patent Office in application No. 18741016.2.
Communication dated Jun. 30, 2021 from The State Intellectual Property Office of P R. of China in Application No. 201880007262.7.
Communication dated Apr. 4, 2019 from the Korean Intellectual Property Office in Application No. 10-2019-0021287.

* cited by examiner

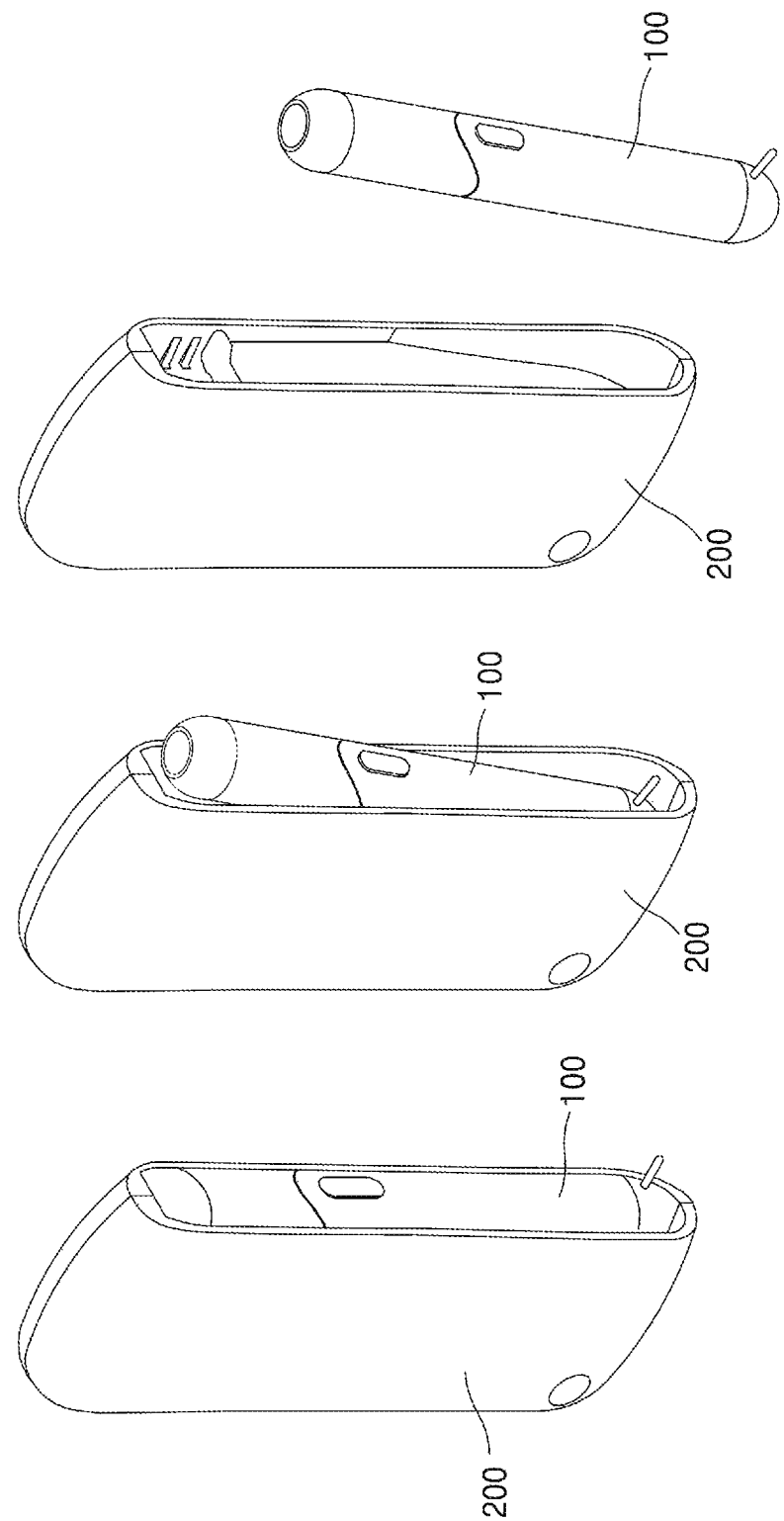

AEROSOL GENERATING DEVICE, METHOD FOR CONTROLLING SAME, AND CHARGING SYSTEM INCLUDING SAME

CROSS REFERENCE TO RELATED APPLICATIONS

This application is a National Stage of International Application No. PCT/KR2018/000871 filed Jan. 18, 2018, claiming priorities based on Korean Patent Application Nos. 10-2017-0008901 filed Jan. 18, 2017, 10-2017-0008904 filed Jan. 18, 2017, 10-2017-0008905 filed Jan. 18, 2017, 10-2017-0058772 filed May 11, 2017, 10-2017-0058775 filed May 11, 2017, 10-2017-0058776 filed May 11, 2017, 10-2017-0146951 filed Nov. 6, 2017, 10-2017-0161440 filed Nov. 29, 2017, 10-2018-0006556 filed Jan. 18, 2018, 10-2018-0006559 filed Jan. 18, 2018 and 10-2018-0006560 filed Jan. 18, 2018.

TECHNICAL FIELD

One or more embodiments relate to an aerosol generating apparatus including various power supply units, a method of controlling the aerosol generating apparatus, and a charging system including the aerosol generating apparatus.

BACKGROUND ART

Inhalation of a favored material, for example, tobacco smoke, may be achieved by inhaling fine particles in the air, that is, aerosol. Conventionally, cigarette-type tobacco has been the only favored material for inhalation, but recently, an electronic cigarette has been established as a way of inhaling the favored material. An electronic cigarette is totally different from a conventional cigarette that generates smoke by burning an inhalation material in view of a method, because the electronic cigarette generates aerosol by applying heat or ultrasonic waves to a cartridge, in which an inhalation material is contained in a liquid form, to vaporize the inhalation material. In addition, an electronic cigarette has advantages of preventing various harmful materials from being generated due to combustion.

Also, according to demand of consumers who prefer a general cigarette-type tobacco, an electronic cigarette having a form including a filter portion and a cigarette portion like a general cigarette has been suggested, and the electronic cigarette is configured so that a user may inhale the inhalation material through the filter portion that is similar to that in the general cigarette, wherein the inhalation material included in the cigarette portion is vaporized by using an electronic heater. In such an electronic cigarette as above, the cigarette portion is filled with paper that is impregnated or coated with the inhalation material, unlike in a general cigarette having the cigarette portion filled with dried tobacco leaves. When the electronic cigarette is inserted into a holder and a heater in the holder is heated to vaporize the inhalation material in the cigarette portion, the user may inhale the vaporized inhalation material through the filter portion. Since the vaporized inhalation material may be inhaled through the filter portion in the same way as in the traditional cigarette while having the advantage of not burning the tobacco like in the electronic cigarette according to the related art, the user may feel like he/she is smoking the traditional cigarette.

An electronic cigarette may be reused after separating and recharging a charger in the electronic cigarette by using an additional charger after use for a predetermined time period. In general, when an electronic cigarette is used for one day or two, a battery thereof is discharged and has to be recharged, and a user may feel inconvenience because the electronic cigarette may turn off while being used. Also, although a capacity of a battery may be increased to increase a usable time of the electronic cigarette, a size of the battery increases and a weight and an outer appearance of the electronic cigarette becomes greater. Also, there is an electronic cigarette having a battery that is replaceable, but a user has to carry the battery always. In addition, it is inconvenient to use the electronic cigarette because the battery has to be separated and charged, and there is a concern about losing the battery.

DESCRIPTION OF EMBODIMENTS

Technical Problem

One or more embodiments of the disclosure provide an aerosol generating apparatus using a variety of inhalation materials without being accompanied by combustion, a method of controlling the aerosol generating apparatus, and a charging system including the aerosol generating apparatus.

Also, one or more embodiments provide an aerosol generating apparatus allowing a user to successively smoke without interrupting the smoking of the user, a method of controlling the aerosol generating apparatus, and a charging system including the aerosol generating apparatus.

Also, one or more embodiments provide an aerosol generating apparatus including a heater and/or a temperature sensor having a reduced number of components and being provided with various designs, and an aerosol generating method.

Also, one or more embodiments provide an aerosol generating apparatus that may supply power simply through a detachable type power storage device or an additional auxiliary power storage device and is portable and easy to use, a method of controlling the aerosol generating apparatus, and a charging system including the aerosol generating apparatus.

Solution to Problem

According to an aspect of the disclosure, an aerosol generating apparatus includes: a main body in which a cigarette is inserted; a first electrically conductive pattern provided on a portion of the main body to function as one of a heater for heating the cigarette and a temperature sensor sensing a temperature of the cigarette; a second electrically conductive pattern provided on another portion of the main body to function as one of the heater and the temperature sensor; and a controller controlling the first electrically conductive pattern and the second electrically conductive pattern to make the first electrically conductive pattern and the second electrically conductive pattern function as one of the heater and the temperature sensor.

Advantageous Effects of Disclosure

According to one or more embodiments of the disclosure, there are provided an aerosol generating apparatus capable of vaporizing an aerosol forming material without being accompanied by combustion, a method of controlling the aerosol generating apparatus, and a charging system including the aerosol generating apparatus.

Also, provided are an aerosol generating apparatus including a plurality of conductive patterns at different locations of a main body to use the conductive patterns a heater or a temperature sensor and reduce the number of components, and including the heater and the temperature sensor of various types, a method of controlling the aerosol generating apparatus, and a charging system including the aerosol generating apparatus.

Also, provided are an aerosol generating apparatus capable of uniformly heating a cigarette inserted into the aerosol generating apparatus, in which residue of the cigarette may not remain in the heater after smoking and the heater may not easily break, a method of controlling the aerosol generating apparatus, and a charging system including the aerosol generating apparatus.

Also, provided are an aerosol generating apparatus capable of preventing unintentional operation stop because power may be supplied in various ways, a method of controlling the aerosol generating apparatus, and a charging system including the aerosol generating apparatus.

BRIEF DESCRIPTION OF DRAWINGS

FIG. 23 is a perspective view showing a process of separating the aerosol generating apparatus of FIG. 1 from the external power supply device.

BEST MODE

Figure 1:
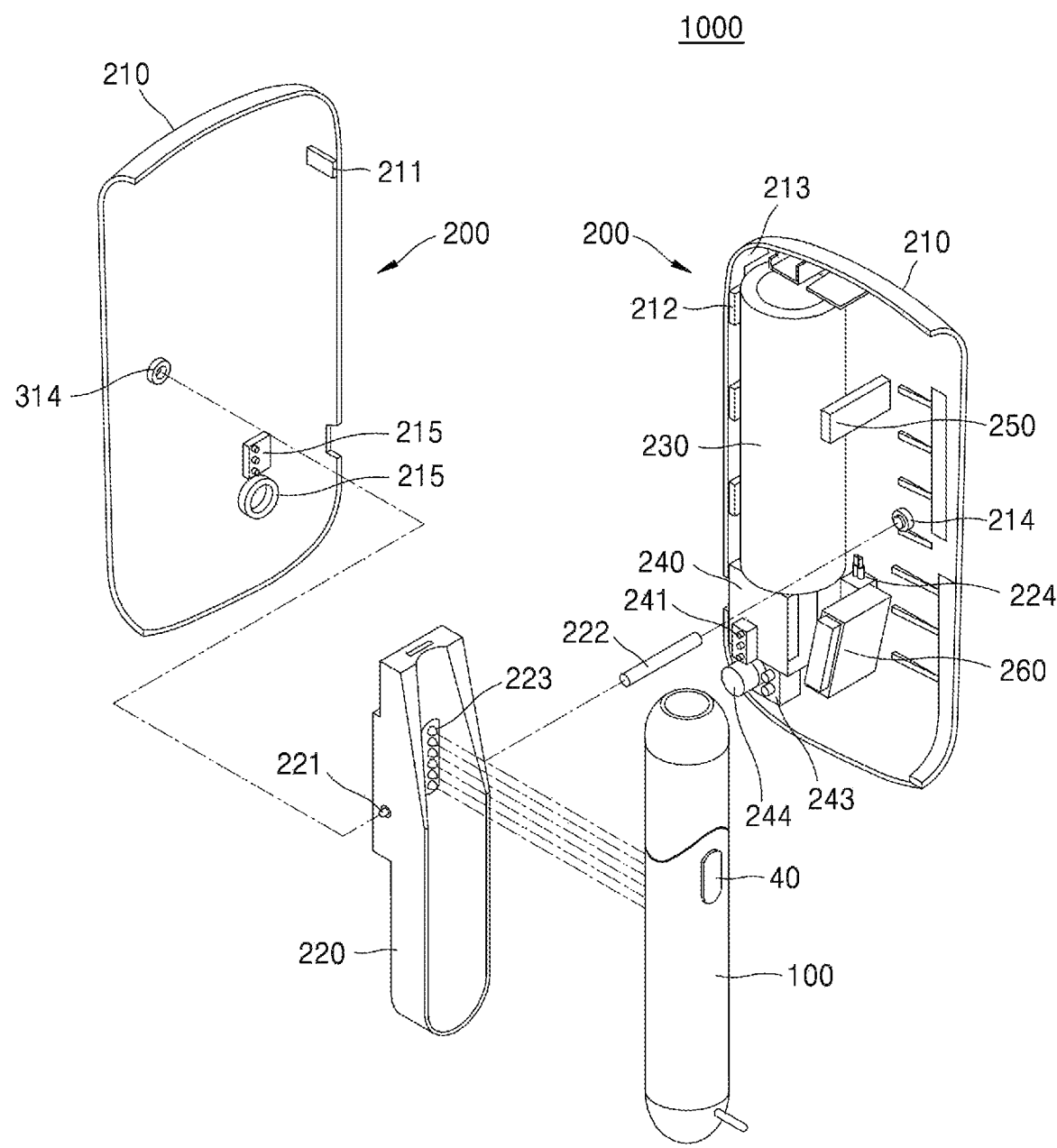
FIG. 1 is an exploded perspective view of a charging system according to an embodiment.

According to an embodiment of the disclosure, an aerosol generating apparatus includes: a main body in which a cigarette is inserted; a first electrically conductive pattern provided on a portion of the main body to function as one of a heater for heating the cigarette and a temperature sensor sensing a temperature of the cigarette; a second electrically conductive pattern provided on another portion of the main body to function as one of the heater and the temperature sensor; and a controller controlling the first electrically conductive pattern and the second electrically conductive pattern to make the first electrically conductive pattern and the second electrically conductive pattern function as one of the heater and the temperature sensor.

In the embodiment, the first electrically conductive pattern may function as a heater and the second electrically conductive pattern may function as a temperature sensor.

In the embodiment, the first electrically conductive pattern and the second electrically conductive pattern may alternately function as one of the heater and the temperature sensor.

In the embodiment, the first electrically conductive and the second electrically conductive pattern may function as the heater.

In the embodiment, the controller may sense a temperature by measuring a thermal resistance of one or more of the first electrically conductive pattern and the second electrically conductive pattern.

In the embodiment, the main body may have a cylindrical structure having a hollow therein, the first electrically conductive pattern may be provided on an inner circumferential surface of the main body, and the second electrically conductive pattern may be provided on an outer circumferential surface of the main body.

In the embodiment, the main body may be obtained by partitioning a cylinder having a hollow into two or more pieces in a circumferential direction, the first electrically conductive pattern may be provided on an inner circumferential surface of each piece and the second electrically conductive pattern may be provided on an outer circumferential surface of each piece.

According to another embodiment, a method of controlling an aerosol generating apparatus includes: instantly raising a temperature of a cigarette by using a first electrically conductive pattern and a second electrically conductive pattern as heaters for heating the cigarette; and heating the cigarette to a target temperature by using one of the first electrically conductive pattern and the second electrically conductive pattern as the heater and the other of the first electrically conductive pattern and the second electrically conductive pattern as a temperature sensor for measuring the temperature of the cigarette.

In the embodiment, when the first electrically conductive pattern is closer to the cigarette than the second electrically conductive pattern, in the heating of the cigarette to the target temperature, the first electrically conductive pattern may be used as the heater and the second electrically conductive pattern may be used as the temperature sensor.

In the embodiment, when the temperature of the cigarette reaches the target temperature, the temperature of the cigarette may be maintained by using the first electrically conductive pattern as the temperature sensor and using the second electrically conductive pattern as the heater.

According to another embodiment of the disclosure, a charging system for an aerosol generating apparatus includes: an aerosol generating apparatus including a heater generating heat due to resistance when an electric current is applied thereto, a power storage unit supplying power to the heater, and a controller controlling the heater; and an external power supply device including a case, a charging accommodation portion provided rotatably on the case to accommodate the aerosol generating apparatus to be detachable, an auxiliary power storage device storing power that is to be transferred to the aerosol generating apparatus, and an auxiliary power supply device controlling the auxiliary power storage device to supply the power to the aerosol generating apparatus.

In the embodiment, when the charging accommodation portion is in parallel with a lengthwise direction of the case, in a state where the aerosol generating apparatus is attached to the charging accommodation portion, the auxiliary power supply device may allow the auxiliary power storage device to supply power to the aerosol generating apparatus and the aerosol generating apparatus to operate in a cleaning mode, in which the aerosol generating apparatus is cleaned.

In the embodiment, when the charging accommodation portion is in parallel with a lengthwise direction of the case, in a state where the aerosol generating apparatus is attached to the charging accommodation portion, the auxiliary power supply device may allow the auxiliary power storage device to supply power to the aerosol generating apparatus and the aerosol generating apparatus to operate in a pre-heating mode, in which the aerosol generating apparatus is pre-heated.

In the embodiment, the aerosol generating apparatus may further include a first button portion that transfers an activation signal to the controller through a manipulation of a user to allow the power storage unit to supply power to the heater, and transfers a deactivation signal to the controller through a manipulation of the user while the power is supplied from the power storage unit to the heater to block the power supply from the power storage unit to the heater.

In the embodiment, the external power supply device may further include a second button portion that transfers an activation signal to the auxiliary power supply device through a manipulation of the user to allow the auxiliary power storage device to supply power to the aerosol generating apparatus, and transfers a deactivation signal to the auxiliary power supply device through a manipulation of the user while the power is supplied from the auxiliary power storage device to the aerosol generating apparatus to block the power supply from the auxiliary power storage device to the aerosol generating apparatus.

In the embodiment, the charging system may further include a first magnetic body and a second magnetic body provided on a case to face each other about a rotating center of the charging accommodation portion, and the charging accommodation portion may include a third magnetic body facing one of the first magnetic body and the second magnetic body.

In the embodiment, one of the first and second magnetic bodies may be provided on the case to be inclined with respect to a lengthwise direction of the case.

In the embodiment, the aerosol generating apparatus may include a fourth magnetic body facing the other of the first and second magnetic bodies.

In the embodiment, a magnetic force may be applied between the first magnetic body and the third magnetic body, between the first magnetic body and the fourth magnetic body, between the second magnetic body and the third magnetic body, and between the second magnetic body and the fourth magnetic body.

In the embodiment, the external power supply device may further include an accommodation portion for accommodating the auxiliary power storage device and the auxiliary power supply device.

In the embodiment, the charging system may further include an electronic circuit connecting the auxiliary power storage device to the heater, the heater generates heat by receiving electric power from the auxiliary power storage device, and the electronic circuit may at least partially include a single-crystalline material.

In the embodiment, the aerosol generating apparatus may further include a cartridge for accommodating the cigarette, and the cigarette accommodated in the cartridge may be heated within a preset temperature range by rapidly raising the temperature of the heater connected to the electronic circuit.

In the embodiment, wires included in the electronic circuit may at least partially include a single-crystalline material.

In the embodiment, the single-crystalline material may be formed from at least one of an ingot form and a thin film form.

In the embodiment, the single-crystalline material may include single-crystalline copper (Cu).

In the embodiment, the heater may include a ceramic rod having a cutting-edge, a first protective layer surrounding the ceramic rod, a green sheet wound on the first protective layer and having electrode patterns including a heater electrode pattern printed thereon, and a second protective layer surrounding the green sheet.

In the embodiment, the electrode patterns of the green sheet may be printed by a silk screen method or an inkjet printing method.

In the embodiment, the electrode patterns may be printed on both sides of the green sheet.

In the embodiment, the electrode pattern on one of the both sides may include a sensor electrode pattern.

In the embodiment, the charging system may further include a flange coupled to the ceramic rod surrounded by the green sheet and the first protective layer and bridge wires connected to the printed electrode patterns of the green sheet, and the bridge wires may be three-wire type or four-wire type.

Other aspects, features and advantages of the disclosure will become better understood through the accompanying drawings, the claims and the detailed description.

MODE OF DISCLOSURE

As the present disclosure allows for various changes and numerous embodiments, particular embodiments will be illustrated in the drawings and described in detail in the written description. The attached drawings for illustrating one or more embodiments are referred to in order to gain a sufficient understanding, the merits thereof, and the objectives accomplished by the implementation. However, the embodiments may have different forms and should not be construed as being limited to the descriptions set forth herein. That is, things that one of ordinary skill in the art may easily infer from the following detailed description and examples are interpreted to fall within the scope of the disclosure.

The terms "consist(s) of" or "include(s) (or comprise(s))" should not be interpreted or understood as including, without exception, all of the plurality of elements or the plurality of steps disclosed in the description. In other words, it should be understood that some of the elements or some of the steps may not be included, or that additional elements or steps may be further included.

While such terms as "first," "second," etc., may be used to describe various components, such components are not be limited to the above terms. The above terms are used only to distinguish one component from another. An expression used in the singular encompasses the expression of the plural, unless it has a clearly different meaning in the context.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant. In this case, the meaning of the selected terms will be described in the detailed description. Thus, the terms used herein have to be defined based on the meaning of the terms together with the description throughout the specification.

Sizes of components in the drawings may be exaggerated for convenience of explanation. In other words, since sizes and thicknesses of components in the drawings are arbitrarily illustrated for convenience of explanation, the following embodiments are not limited thereto.

One or more embodiments are related to an aerosol generating apparatus, and detailed descriptions about known matters to those of ordinary skill in the art will be omitted.

The example embodiments will be described below in more detail with reference to the accompanying drawings. Those components that are the same or are in correspondence are rendered the same reference numeral regardless of the figure number, and redundant explanations are omitted.

Figure 2:
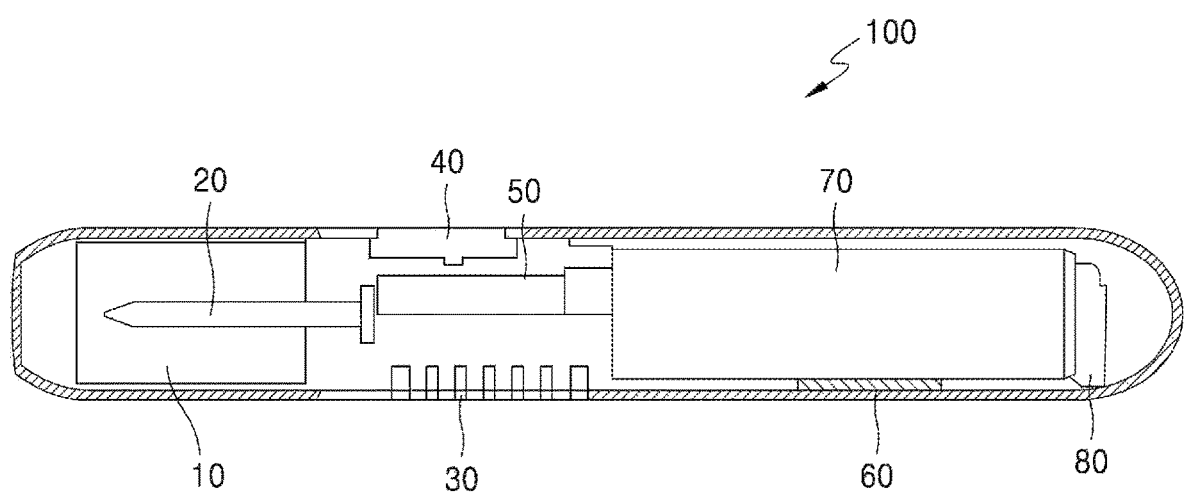
FIG. 2 is a cross-sectional view of an aerosol generating apparatus of FIG. 1.

FIG. 1 is an exploded perspective view of a charging system according to an embodiment, and FIG. 2 is a cross-sectional view of an aerosol generating apparatus of FIG. 1.

Referring to FIG. 1 and FIG. 2, a charging system for an aerosol generating apparatus (hereinafter, referred to as "charging system") 1000 includes an aerosol generating apparatus 100 including a heater 20 that generates heat when an electric current is applied thereto, a power storage unit 70 supplying electric power to the heater 20, and a controller 50 for controlling the heater 20, and an external power supply device 200 including a case 210, a charging accommodation portion 220 provided to be rotatable in the case 210 to accommodate the aerosol generating apparatus 100 detachably, an auxiliary power storage device 230 storing power to be supplied to the aerosol generating apparatus 100, and an auxiliary power supply device 240 supplying the power to the aerosol generating apparatus 100 by controlling the auxiliary power storage device.

Referring to FIG. 2, the aerosol generating apparatus 100 includes a first button portion 40 that may be pushed to pre-heat the aerosol generating apparatus 100, the heater 20 that generates heat due to resistance when an electric current is applied thereto, the power storage unit 70 capable of instantly supplying high power to the heater 20, and the controller 50 for controlling the heater 20. The heater 20 generates aerosol a vaporizing material including an aerosol generating material that vaporizes when being heated to a predetermined temperature or greater accommodated in a cartridge 10.

For example, when a user manipulates the first button portion 40 to transfer an activation signal to the controller 50, the power storage unit 70 supplies the electric power to the heater 20 to heat the heater 20. On the contrary, when the user manipulates the first button portion 40 while the heater 20 is heated, a deactivation signal is transferred to the controller 50 to block the power supply from the power storage unit 70 to the heater 20.

When an electronic tobacco of a cigarette type filled with paper impregnated or coated with an inhalation material is inserted to the cartridge 10, the heater 20 is heated to vaporize the inhalation material in a cigarette portion and the user may inhale the inhalation material that is vaporized through a filter portion.

When the aerosol generating apparatus 100 does not operate and needs to be charged because the heater 20 lacks electric power or when the aerosol generating apparatus 100 is ready to operate, the controller 50 drives a motor 80 to vibrate the aerosol generating apparatus 100 so that the user may recognize it.

Also, the controller 50 displays a remaining power of the power storage unit 70 via a first display portion (not shown) provided in the aerosol generating apparatus 100, and even when the aerosol generating apparatus 100 is impossible to operate because the heater 20 lacks the electric power, the status of the power storage unit 70 may be displayed through the first display portion.

The power storage unit 70 may be supplied with the electric power through the charging terminal 30 of the aerosol generating apparatus 100 via wires, wherein the charging terminal 30 is connected to the charging terminal 223 of the charging accommodation portion 220 in a state where the aerosol generating apparatus 100 is accommodated in the charging accommodation portion 220 of the external power supply device 200, and when the aerosol generating apparatus 100 receives the power supply, the controller 50 may display the electric power supplied to the power storage unit 70 through a second display portion (not shown).

The aerosol generating apparatus 100 may perform data communication with the charging terminal 223 of the external power supply device 200 via the charging terminal 30. Also, the aerosol generating apparatus 100 may include an additional wireless communication port. The controller 50 guides communication between a wireless communication port in the aerosol generating apparatus 100 and a wireless communication port in the external power supply device 200 s as to perform data communication with the auxiliary power supply device 240, and then may receive the power supply wirelessly from the external power supply device 200.

The power storage unit 70 may be separated from the aerosol generating apparatus 100, and the external power supply device 200 includes a plurality of accommodation portions for accommodating the power storage unit 70 so that one or more power storage devices 70 separated from the aerosol generating apparatus 100 may be accommodated and charged therein.

Also, the aerosol generating apparatus 100 may include a power-generation unit that converts external energy such as optical energy or mechanical energy into electrical energy to charge the power storage unit 70.

Figure 3:
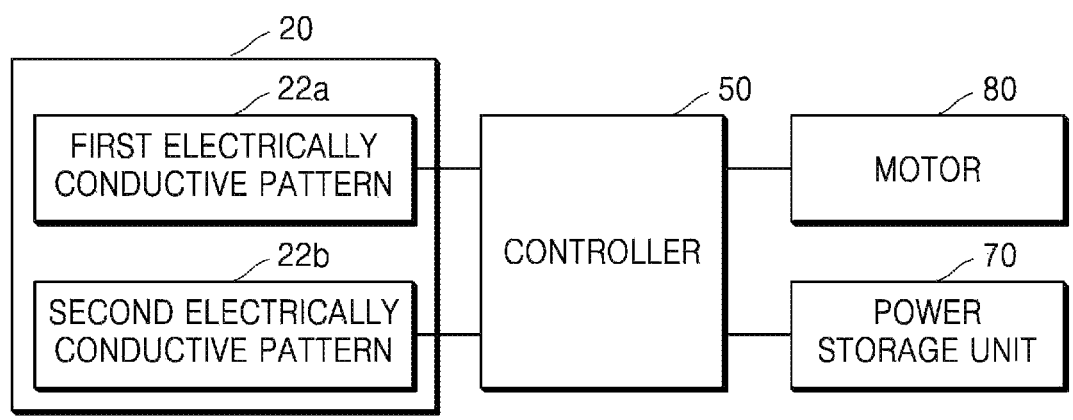
FIG. 3 is a block diagram showing some of components in the aerosol generating apparatus of FIG. 1.
Figure 4:
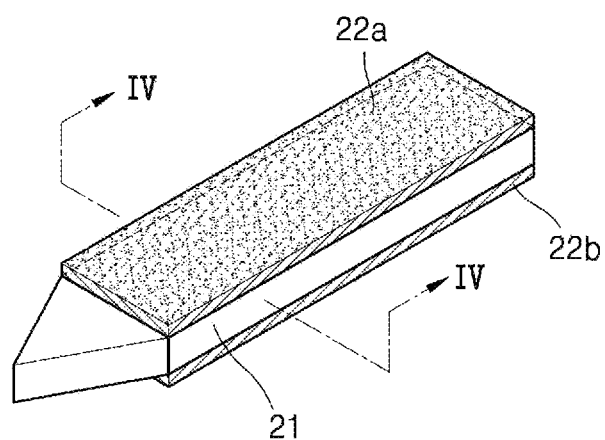
FIG. 4 is a perspective view showing some of the components in the aerosol generating apparatus of FIG. 1.
Figure 5:
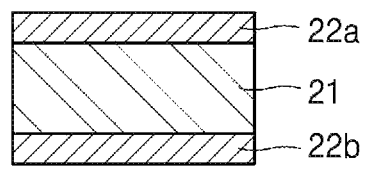
FIG. 5 is a cross-sectional view taken along a line IV-IV of FIG. 4.

FIG. 3 is a block diagram of some of the components in the aerosol generating apparatus of FIG. 1, FIG. 4 is a perspective view showing some of the components in the aerosol generating apparatus of FIG. 1, and FIG. 5 is a cross-sectional view taken along line IV-IV of FIG. 4.

Referring to FIG. 3 to FIG. 5, the aerosol generating apparatus 100 includes a heater 20 that generates heat by the electricity and heats a vaporizing material to generate aerosol, wherein the vaporizing material includes an aerosol forming material that vaporizes when being heated to a predetermined temperature or greater, and the heater 20 includes a main body 21 in which a cigarette is inserted, a first electrically conductive pattern 22a provided on a portion of the main body 21 and functioning as one of a heater that heats the cigarette and a temperature sensor sensing a temperature of the cigarette, a second electrically conductive pattern 22b provided on another portion of the main body 21 and functioning as one of a heater and a temperature sensor, and a controller 50 controlling the first and second electrically conductive patterns 22a and 22b so that each of the first and second electrically conductive patterns 22a and 22b functions as one of the heater and the temperature sensor. The first electrically conductive pattern 22a and the second electrically conductive pattern 22b are respectively connected to an additional power supply unit such as the power storage unit 70.

The main body 21 may include, but is not limited to, a ceramic material. For example, the main body 21 may include a material having non-conductive, thermal-resistant, and less deformable characteristics. Also, the main body 21 may be formed to have an acute angle at an end portion that firstly contacts the cigarette when the cigarette is inserted, but one or more embodiments are not limited thereto. For example, the main body 21 may be formed in any type provided that the cigarette is inserted into the main body 21.

The first and second electrically conductive patterns 22a and 22b include an electrically resistant material. For example, the electrically conductive track may include metal. As another example, the electrically conductive track may include an electrically conductive ceramic material, carbon, metal alloy, or a composite material of a ceramic material and metal.

Referring to FIG. 5, a cut surface of the main body 21 that is cut perpendicularly to a lengthwise direction of the cigarette may have a rectangular shape, but one or more embodiments of the disclosure are not limited thereto. That is, the cut surface of the main body 21 that is cut perpendicularly to the lengthwise direction of the cigarette may have a polygonal shape, a side of the cut surface may be a curve, or the cut surface may have a circular or an oval shape. Here, a case in which the cut surface of the main body 21 cut perpendicularly to the lengthwise direction of the cigarette has a circular shape will be described below with reference to FIGS. 6 to 11, and a case in which the cut surface of the main body 21 that is cut perpendicularly to the lengthwise direction of the cigarette has a rectangular shape will be described for convenience of description.

When the cut surface of the main body 21 that is cut perpendicularly to the lengthwise direction of the cigarette has a rectangular shape, as shown in FIGS. 4 and 5, the first electrically conductive pattern 22a is provided on a surface of the main body 21 and the second electrically conductive pattern 22b may be provided on another surface different from the above surface.

The controller 50 controls the heater 20 so that the first electrically conductive pattern 22a functions as a heater and the second electrically conductive pattern 22b functions as a temperature sensor. That is, one of the first and second electrically conductive patterns 22a and 22b functions as a heater and the other functions as a temperature sensor. When the first electrically conductive pattern 22a functions as the temperature sensor, the second electrically conductive pattern 22b may function as the heater.

Also, in order to increase lifespan of the heater 20, the controller 50 may control the heater 20 so that the first and second electrically conductive patterns 22a and 22b may alternately function as the heater and the temperature sensor.

Also, when the user pushes the first button portion 40 of the aerosol generating apparatus 100 and the aerosol generating apparatus 100 enters a pre-heating stage, the heater 20 requires instantly high voltage, and the controller 50 controls the first and second electrically conductive patterns 22a and 22b of the main body 21 to function as the heater 20 in order to instantly increase the temperature of the heater 20. In addition, in a vaporizing temperature maintaining stage, the controller 50 controls the first and second electrically conductive patterns 22a and 22b of the main body 21 to function alternately as the heater and the temperature sensor.

Also, one or more of the first and second electrically conductive patterns 22a and 22b may function as the temperature sensor that senses temperature by measuring thermal resistance.

Figure 6:
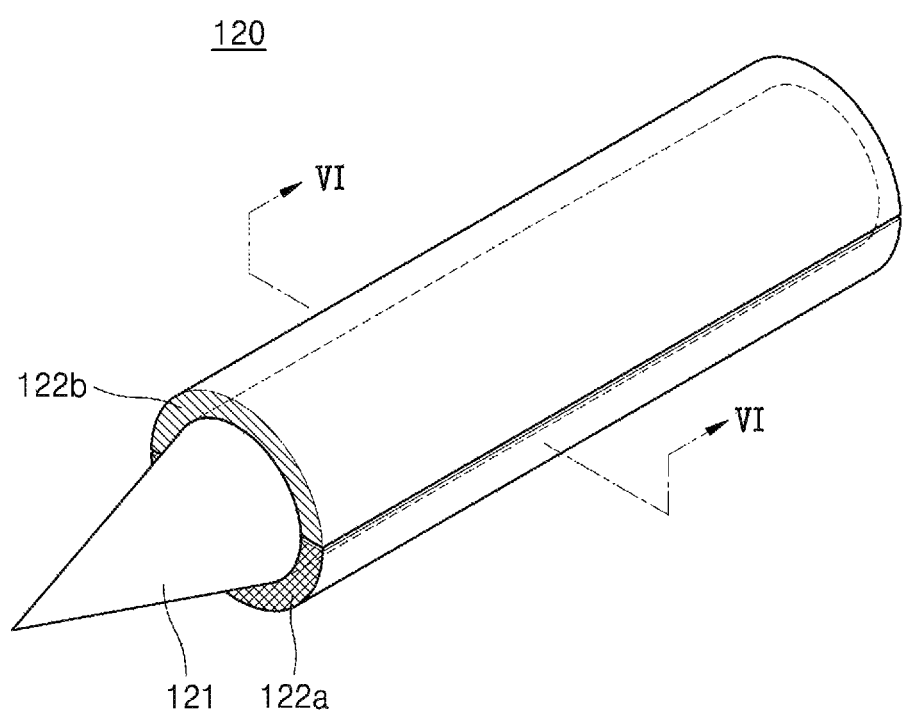
FIG. 6 is a perspective view showing some of components in the aerosol generating apparatus of FIG. 4 according to another embodiment.
Figure 7:
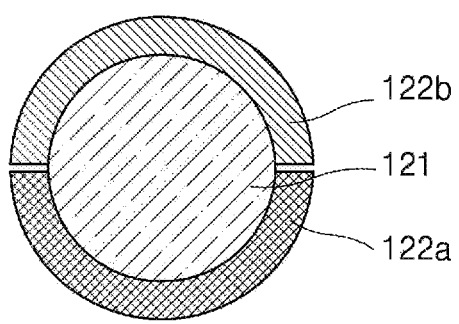
FIG. 7 is a cross-sectional view taken along a line VI-VI of FIG. 6.

FIG. 6 is a perspective view showing some of the components in the aerosol generating apparatus of FIG. 4 according to another embodiment, and FIG. 7 is a cross-sectional view taken along line VI-VI of FIG. 6.

Referring to FIGS. 6 and 7, an electronic heater 120 may include a main body 121 of a sewing needle shape, a first electrically conductive pattern 122a formed on a portion of an outer circumferential surface of the main body 121, and a second electrically conductive pattern 122b formed on another portion of the outer circumferential surface of the main body 121. The first and second electrically conductive patterns 122a and 122b may be respectively connected to an additional power supply unit such as the power storage unit 70.

Figure 8:
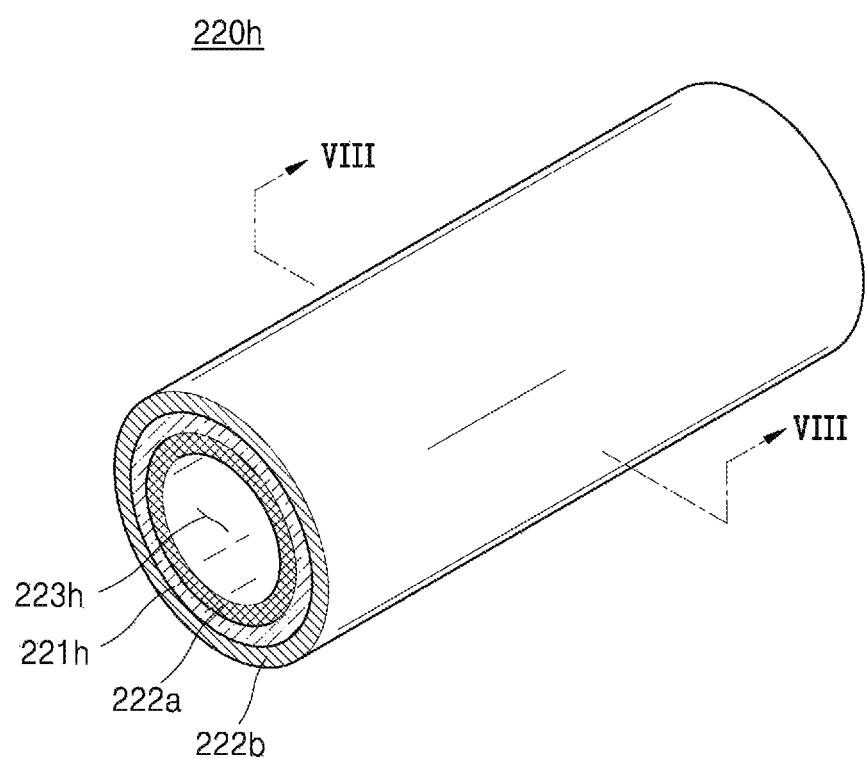
FIG. 8 is a perspective view showing some of components in the aerosol generating apparatus of FIG. 4 according to another embodiment.
Figure 9:
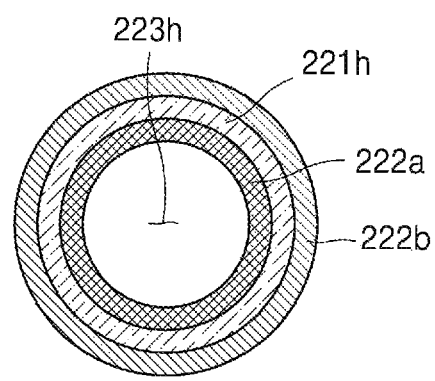
FIG. 9 is a cross-sectional view taken along a line VII-VII of FIG. 8.

FIG. 8 is a perspective view showing some of the components in the aerosol generating apparatus of FIG. 4 according to another embodiment, and FIG. 9 is a cross-sectional view taken along line VII-VII of FIG. 8.

Referring to FIGS. 8 and 9, an electronic heater 220h includes a main body 221h of a cylindrical shape having a hollow 223h therein, a first electrically conductive pattern 222a provided on an inner circumferential surface of the main body 221h, and a second electrically conductive pattern 222b provided on an outer circumferential surface of the main body 221h. The first and second electrically conductive patterns 222a and 222b are respectively connected to an additional power supply unit such as the power storage unit 70.

For example, the cigarette is inserted into the hollow 223h. That is, the first electrically conductive pattern 222a may be in contact with an outer circumferential surface of the cigarette. In the aerosol generating apparatus 100 having the above structure, when a user inserts the cigarette into the aerosol generating apparatus 100 and pushes the first button portion 40 so that the aerosol generating apparatus 100 enters the pre-heating stage, the controller 50 may control both the first electrically conductive pattern 222a contacting the cigarette and the second electrically conductive pattern 222*b* not contacting the cigarette to function as the heater in order to rapidly increase the temperature of the cigarette.

When there is no need to rapidly increase the temperature in the pre-heating stage, the controller 50 may control the first electrically conductive pattern 222*a* contacting the cigarette to function as the heater and the second electrically conductive pattern 222*b* not contacting the cigarette to function as the temperature sensor. Also, in a vaporizing temperature maintaining stage, the controller 50 may control the second electrically conductive pattern 222*b* not contacting the cigarette to function as the heater and the first electrically conductive pattern 222*a* contacting the cigarette to function as the temperature sensor.

Figure 10:
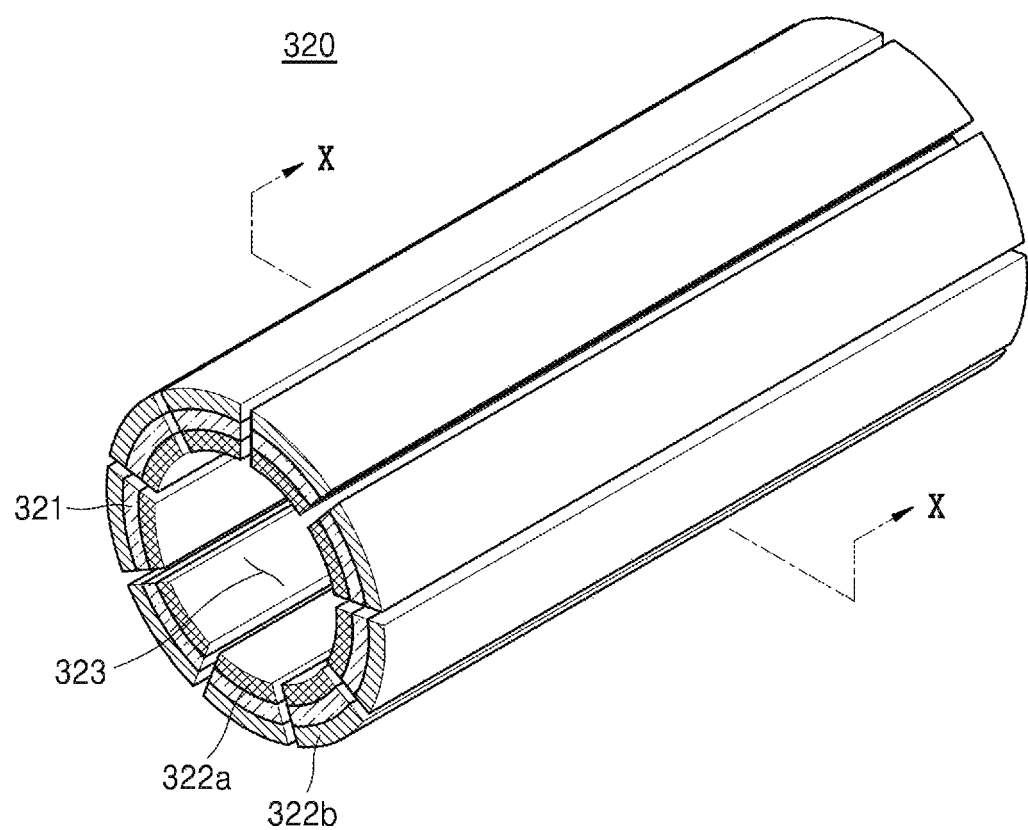
FIG. 10 is a perspective view showing some of components in the aerosol generating apparatus of FIG. 4 according to another embodiment.
Figure 11:
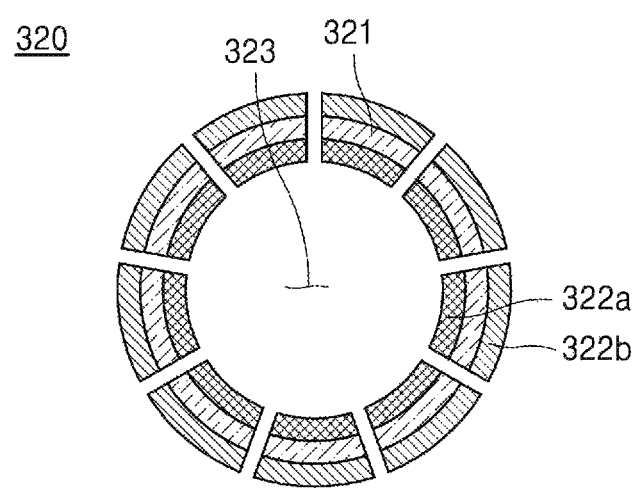
FIG. 11 is a cross-sectional view taken along a line VI-VI of FIG. 10.

FIG. 10 is a perspective view showing some of the components in the aerosol generating apparatus of FIG. 4 according to another embodiment, and FIG. 11 is a cross-sectional view taken along line X-X of FIG. 10.

Referring to FIG. 10 and FIG. 11, an electronic heater 320 includes a main body 321 having a cylindrical shape partitioned as a plurality of pieces in a circumferential direction thereof, wherein the cylindrical shape has a hollow 323 therein, a first electrically conductive pattern 322*a* provided on an inner circumferential surface of each piece of the main body 321, and a second electrically conductive pattern 322*b* provided on an outer circumferential surface of each piece of the main body 321.

A plurality of first electrically conductive patterns 322*a* and second electrically conductive patterns 322*b* are respectively connected to power supply units such as the power storage unit 70. The controller 50 controls the electronic heater 320 so that the first electrically conductive pattern 322*a* functions as a heater and the second electrically conductive pattern 322*b* functions as a temperature sensor.

Also, the controller 50 controls the first electrically conductive pattern 322*a* and the second electrically conductive pattern 322*b* to alternately function as the heater and the sensor in order to increase lifespan of the electronic heater 320.

Also, when the user pushes the first button portion 40 of the aerosol generating apparatus 100 and the aerosol generating apparatus 100 enters a pre-heating stage, the electronic heater 320 requires instantly high voltage, and the controller 50 controls the first and second electrically conductive patterns 322*a* and 322*b* to function as the electronic heater 320 in order to instantly increase the temperature of the electronic heater 320.

Also, in a structure in which the cigarette is inserted into the hollow 323, when a user inserts the cigarette in the aerosol generating apparatus 100 and pushes the first button portion 40 so that the aerosol generating apparatus 100 enters the pre-heating stage, the controller 50 may control the first electrically conductive pattern 322*a* contacting the cigarette to function as the heater and control the second electrically conductive pattern 322*b* not contacting the cigarette to function as the sensor in order to rapidly increase the temperature of the cigarette.

Also, in a vaporizing temperature maintaining stage, the controller 50 may control the second electrically conductive pattern 322*b* not contacting the cigarette to function as the heater and the first electrically conductive pattern 322*a* contacting the cigarette to function as the sensor.

Figure 12:
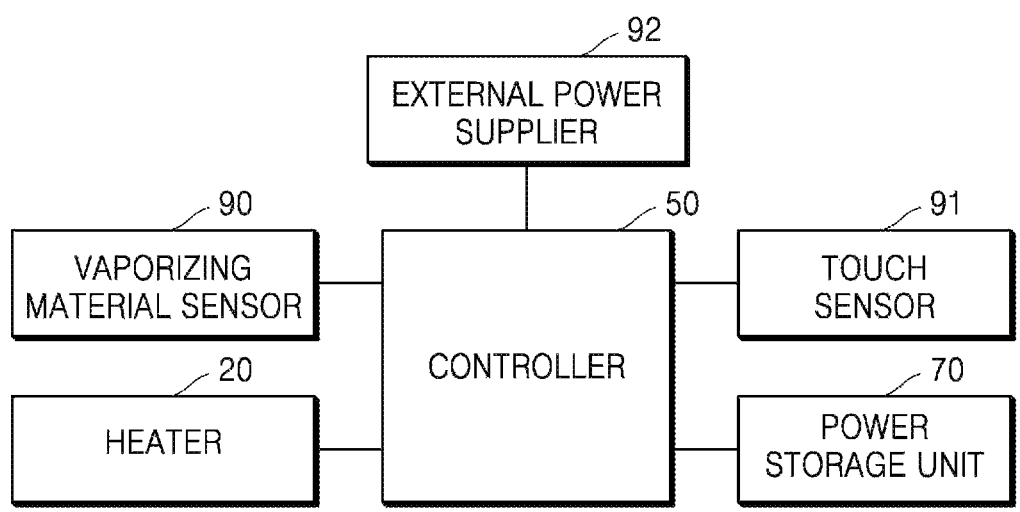
FIG. 12 is a block diagram showing some of components in the aerosol generating apparatus of FIG. 1.

FIG. 12 is a block diagram showing some of components in the aerosol generating apparatus of FIG. 1.

Referring to FIG. 12, the aerosol generating apparatus 100 includes the heater 20 that generates heat due to resistance when electric current is applied thereto, the power storage unit 70 that supplies high electric power instantly to the heater 20, a vaporizing material sensor 90 sensing whether the vaporizing material is mounted, and the controller 50 controlling at least one of the above-stated elements.

The heater 20 generates fine particles a vaporizing material including a material (vaporizing material) that vaporizes when being heated to a predetermined temperature or greater.

The controller 50 controls the heater 20 in a pre-heating stage, a vaporizing temperature reaching stage, and a vaporizing temperature maintaining stage according to use of the aerosol generating apparatus 100.

For example, when a user inserts an electronic cigarette filled with paper impregnated or coated with an inhalation material, into a cartridge 10 or injects a vaporizing material of a liquid phase into the cartridge 10, the controller 50 senses the vaporizing material via the vaporizing material sensor 90, controls the heater 20 to pre-heat the aerosol generating apparatus 100 and instantly increase the temperature to a desired vaporizing temperature, and then controls the heater 20 to maintain the vaporizing temperature for a predetermined time period.

When the vaporizing material sensor 90 does not sense the vaporizing material in a state where the user pushes the first button portion 40 of the aerosol generating apparatus 100, the controller 50 operates the heater 20 only to the pre-heating stage in order to prevent unnecessary operations. In addition, when the vaporizing material sensor 90 does not sense the vaporizing material even after a predetermined time period elapses, the controller 50 controls the power storage unit 70 to block the power supplied to the heater 20 in order to prevent unnecessary power consumption.

The aerosol generating apparatus 100 may include a touch sensor 91 for sensing a touch of the lips of the user. Therefore, the aerosol generating apparatus 100 may sense the touch of the lips, as well as the vaporizing material, and thus, the controller 50 may control the heater 20 of the aerosol generating apparatus 100.

For example, the controller 50 controls the heater 20 to pre-heat the aerosol generating apparatus 100 in a state where the user pushes the first button portion 40 of the aerosol generating apparatus 100 of FIG. 2, and then, when the touch of the lips of the user is sensed by the touch sensor 91, the controller 50 increases the temperature of the heater 20 to a target vaporizing temperature. Then, the controller 50 controls the heater to maintain the vaporizing temperature for a predetermined time period, so as to control the heater 20 in the pre-heating stage, the vaporizing temperature reaching stage, and the vaporizing temperature maintaining stage.

When the touch of the lips of the user is not sensed by the touch sensor 91 during a time period, in which the heater 20 is controlled to pre-heat the aerosol generating apparatus 100, or during a set time period, the controller 50 controls the power storage unit 70 to block the power supplied to the heater 20 and prevent unnecessary power consumption.

Also, the controller 50 may determine whether the aerosol generating apparatus 100 is in an available status without being recharged, based on a remaining power amount regardless of whether the use of the aerosol generating apparatus 100 has occurred. When the remaining power amount denotes a state in which the aerosol generating apparatus 100 may not operate unless it is recharged, the aerosol generating apparatus 100 may receive the power from the external power supply device 200 through an external power supplier 92 that allows the external power to be supplied. Therefore, termination of using the aerosol generating apparatus 100 because the power storage unit 70 runs out of the power while the user uses the aerosol generating apparatus 100 may be prevented.

In addition, electronic circuits connected from the power storage unit 70 to the heater 20 may be at least partially formed of a single-crystalline material. A single-crystalline material has regular arrangement of atoms, ions, and molecules in a solid, and the single-crystalline material has a structure in which atoms are regularly and completely arranged therein. Even one kind of solid may have a single-crystalline structure or poly-crystalline structure according to arrangement status of atoms, ions, and molecules in the solid.

A single-crystalline material has characteristics of low frequency dependence, low resistivity, high surface stability (hardly oxidized-antioxidation characteristic), no grain boundary scattering, and high adhesion. In particular, since a single-crystalline structure of a solid has a lower resistivity than that of a poly-crystalline structure thereof, for example, heat generation amount of wires may be reduced when the wires of the electronic circuit include a solid material of a single-crystalline structure, a temperature of a resistive heater connected to the electronic circuit may be rapidly increased.

The heater 20 heats the cigarette accommodated in the cartridge 10 to a predetermined temperature or greater to generate fine particles. In general, since fine particles are generated from the cigarette when the cigarette is heated by the heater 20 to a temperature range 200□C to 400□C, the aerosol generating apparatus instantly supplies high power to the heater 20 from the power storage unit 70 to rapidly increase the temperature of the heater 20. For example, the temperature of the heater 20 needs to be rapidly increased within 1, 2, 3, or 4 sec. after starting the operation of the aerosol generating apparatus, so that the cigarette accommodated in the cartridge 10 is heated at a temperature range of 200□C to 400□C.

To this end, the electronic circuit connecting the power storage unit 70 to the heater 20 may at least partially include a single-crystalline material. When the wires included in the electronic circuit include at least partially a single-crystalline material, the heat generation amount of the wire may be reduced due to the low resistivity of the single-crystalline material, and thus, the temperature of the heater 20 connected to the electronic circuit may be rapidly increased to a desired temperature. That is, since the wires included in the electronic circuit include the single-crystalline material having low resistivity and the temperature of the heater 20 may be rapidly increased to heat the cigarette at the preset temperature range, power efficiency of the fine particle generator may be improved.

In an embodiment, the single-crystalline material may be grown from any one of the group consisting of gold, copper, silver, aluminum, and nickel. For example, the single-crystalline material may include single-crystalline copper (Cu). However, the single-crystalline material is not limited to the above examples.

Also, the single-crystalline material may be formed from at least one of an ingot form and a thin film form. For example, a single-crystalline material grown as an ingot is cut into plate-shaped pieces, and the wires of the electronic circuit may be formed by using the plate-shaped pieces.

Figure 13:
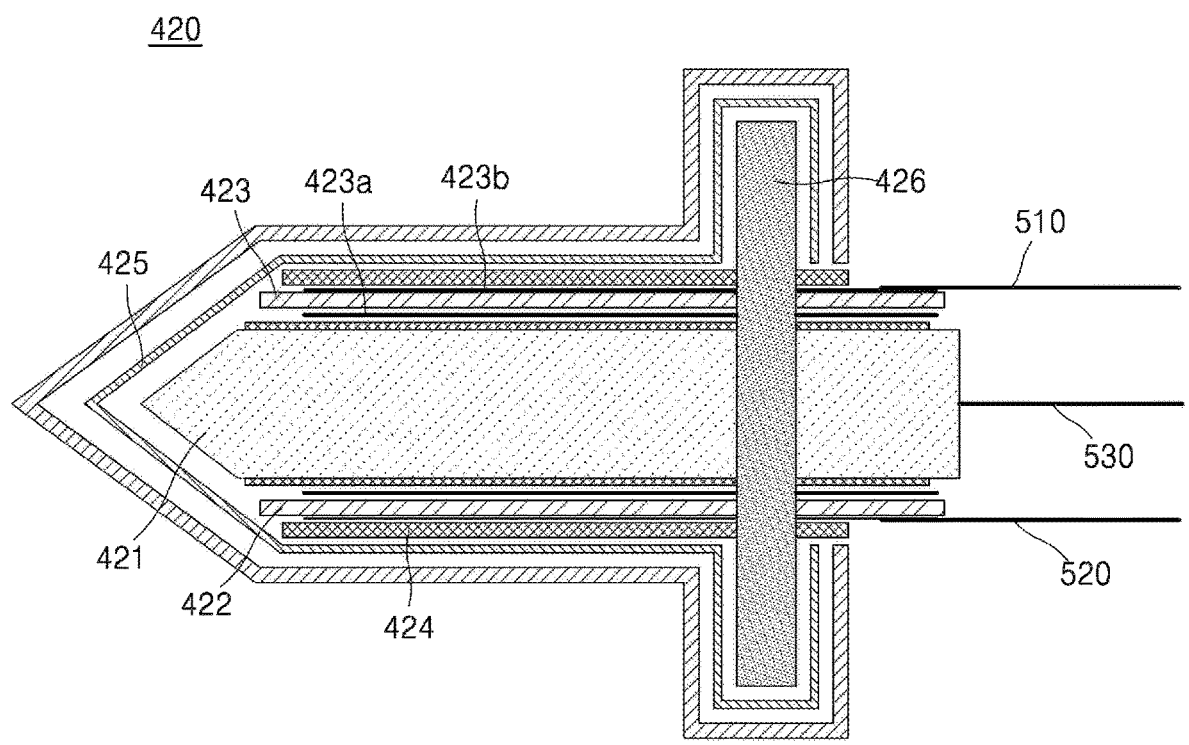
FIG. 13 is a cross-sectional view showing a detailed configuration of a heater in the aerosol generating apparatus of FIG. 12.

FIG. 13 is a cross-sectional view showing a detailed configuration of a heater in the aerosol generating apparatus of FIG. 12.

Referring to FIG. 13, a heater 420 for a rod-type electrical heating smoking device according to an embodiment includes a ceramic rod 421 having a cutting-edge, a first protective layer 422 surrounding the ceramic rod 421, a green sheet 423 wound on the first protective layer 422 and having electrode patterns 423*a* and 423*b* including an electrode pattern of the heater 420 printed thereon, a second protective layer 424 surrounding the green sheet 423, a glass film protective coating layer 425 formed on a coupling body covered with the second protective layer 424, a flange 426 coupled to a coupling body on which the glass film protective coating layer 425, and an anti-fouling coating layer 427 formed on an outermost layer.

The ceramic rod 421 is processed to have an appropriate length and diameter to provide the heater with a rigidity for inserting into the cigarette. After processing the ceramic rod 421, the first protective layer 422 is formed on an outer circumference of the ceramic rod 421 in order to increase attachability of the green sheet 423, on which resistor is printed, and to prevent cracks from occurring in the ceramic rod 421. The first protective layer 422 may be formed by attaching a protective film or performing a glass film coating. The green sheet 423 on which the resistor is printed is attached to the first protective layer 422. The electrode patterns 423*a* and 423*b* are printed on opposite surfaces of the green sheet 423, that is, a heater electrode pattern 423*a* is printed on an internal surface and a sensor electrode pattern 423*b* is printed on an external surface. The electrode patterns 423*a* and 423*b* of the green sheet 423 are printed by a silk screen method or an inkjet printing method.

Figure 14:
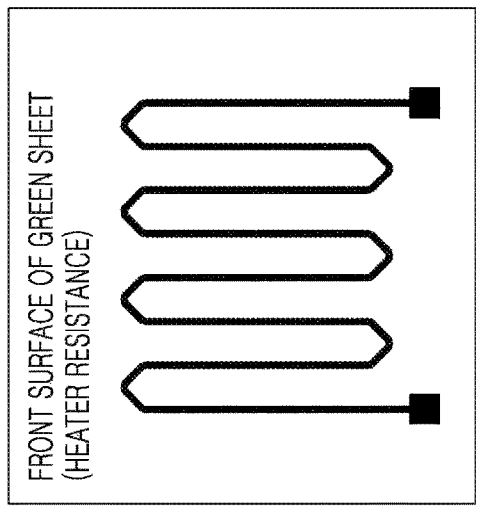
FIG. 14 is a conceptual diagram illustrating a method of manufacturing a resistive double-printed green sheet included in the heater of FIG. 13.
Figure 14:
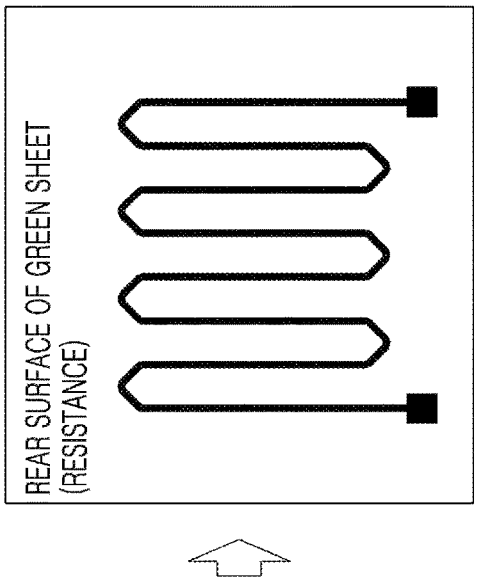
Figure 14:
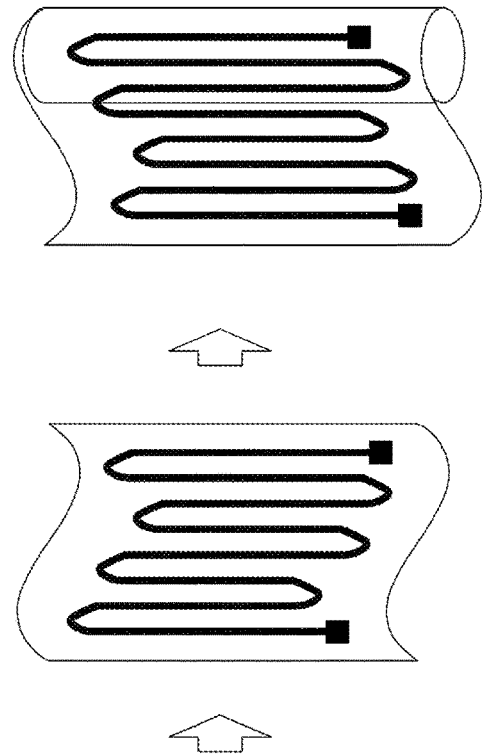

FIG. 14 is a conceptual diagram illustrating a method of manufacturing a green sheet with a resistor printed on opposite surfaces thereof included in the heater of FIG. 13.

Referring to FIG. 14, a ceramic green sheet is manufactured and cut, and then, the heater electrode pattern 423*a* is printed on a surface and the sensor electrode pattern 423*b* is printed on the other surface. The green sheet 423 with the electrode patterns printed on opposite surfaces thereof is wound on an external portion of the first protective layer 422 on the ceramic rod 421. The electrode patterns 423*a* and 423*b* may include one or more selected from Ni, Pt, W, Mo, W—Mo alloy, Nichrome alloy, Kanthal alloy, and stainless steel.

Here, an electrode material included in the sensor electrode pattern 423*b* may have a temperature coefficient of resistance that is higher than that of an electrode material included in the heater electrode pattern 423*a*. Also, the second protective layer 424 is formed on an outer side of the green sheet 423 in order to protect the electrode pattern 423*b* printed on the green sheet 423. The second protective layer 424 may be also formed by performing a glass film coating or winding a protective film.

As such, after attaching or forming the first protective layer 422, the green sheet 423, and the second protective layer 424 sequentially on the ceramic rod 421, the green sheet 423 and the electrode patterns 423*a* and 423*b* are sintered. After that, a primary appearance test and a resistance check of the electrode patterns 423*a* and 423*b* are performed. A body obtained by attaching the first protective layer 422, the green sheet 423, and the second protective layer 424 sequentially on the ceramic rod 421 and sintering the green sheet 423 and the electrode patterns 423*a* and 423*b* is referred to as a ceramic rod assembly.

Figure 15:
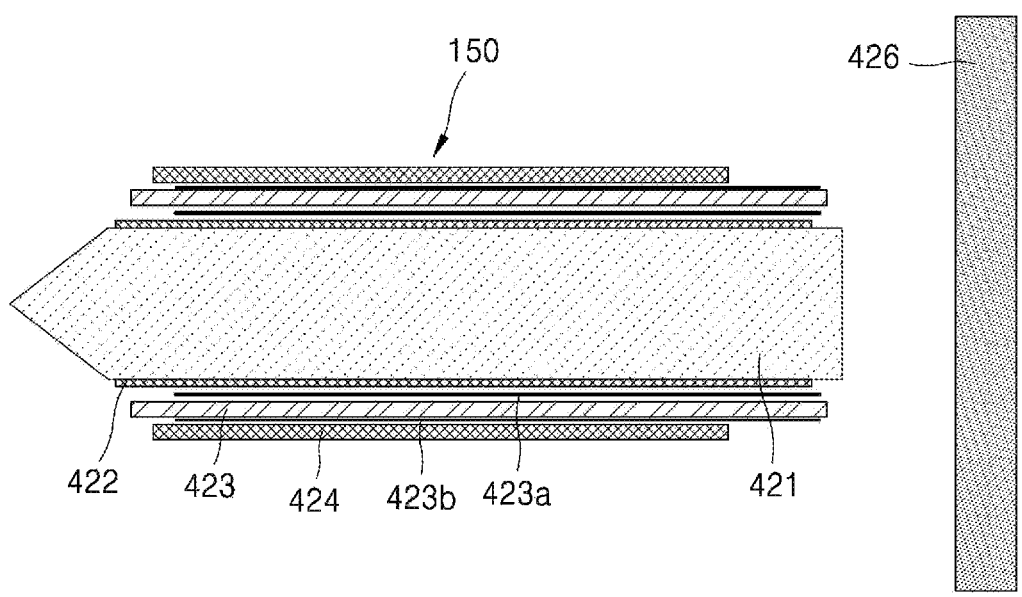
FIG. 15 is a cross-sectional view of a ceramic rod assembly included in the heater of FIG. 13.

FIG. 15 is a cross-sectional view of a ceramic rod assembly included in the heater of FIG. 13.

Referring to FIG. 15, a ceramic rod assembly 150 may have a stair shape at a side of the cutting-edge of the ceramic rod because upper layers have reduced lengths, so that the heater may be easily inserted into the cigarette. The flange 426 for easily installing the heater is coupled to the ceramic rod assembly 150.

Referring to FIG. 13, after coupling the flange 426 to the ceramic rod assembly 150, the glass film protective coating layer 425 may be covered on the ceramic rod assembly 150 so that the stair-shape on the outer appearance of the ceramic rod assembly 150 may have smooth surface. In particular, the glass film protective coating layer 425 covers exposed cutting-edge of the ceramic rod 421, a part of the first protective layer 422 at the cutting-edge side, a part of the green sheet 423 at the cutting-edge side, and entire second protective layer 424. The glass film protective coating layer 425 allows the heater to be smoothly inserted to the cigarette, and may prevent isolation of layers, that is, a plurality of thin films or coating layers, of the heater.

Also, the anti-fouling coating layer 427 may be further formed on an outermost portion of the ceramic rod 421, that is, on an outer portion of the glass film protective coating layer 425. A material for forming the anti-fouling coating layer 427 may include nano-ceramic particles such as $SiO_2$, $Si_3N_4$, and BN.

In addition, the electrode patterns 423a and 423b of the green sheet 423 include soldering pads (not shown) for connecting to bridge wires 510, 520, and 530 that are provided to apply external power. The soldering pad (not shown) may be located at an end of the green sheet 423 so as to be easily connected to the bridge wires 510, 520, and 530, and the end of the green sheet 423 is not the side of the cutting-edge of the ceramic rod 421, but an opposite end of the cutting-edge, that is, a lower end (right side on the drawing). The flange 426 is located above the soldering pad of the green sheet 423 when being coupled to the ceramic rod assembly 150, and thus the soldering pad (not shown) and the bridge wires 510, 520, and 530 are blocked by the flange 426 not to be inserted to the cigarette when the heater is inserted into the cigarette.

Figure 16:
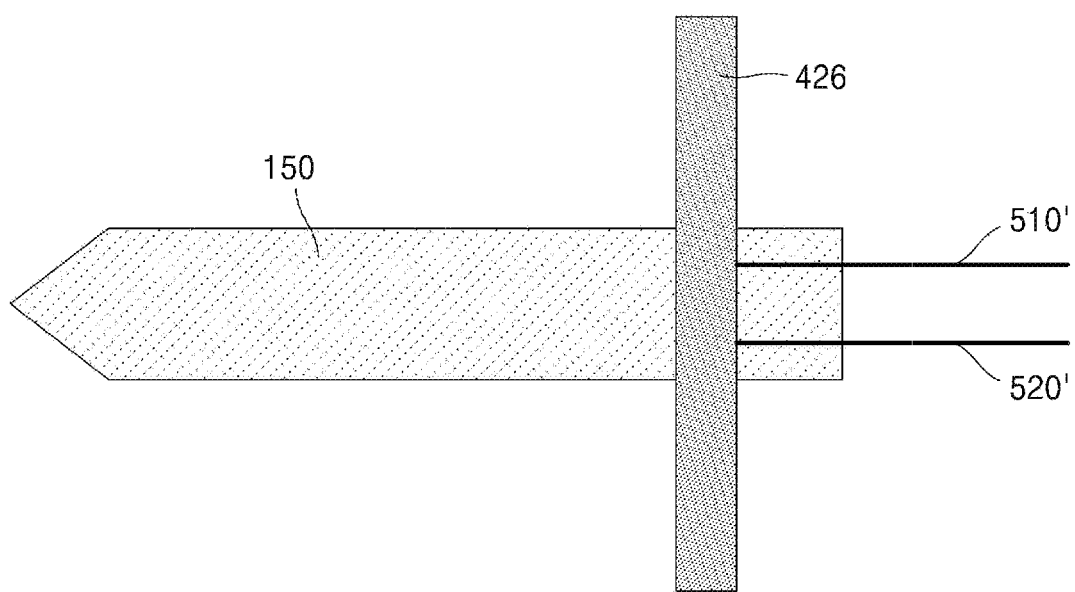
FIG. 16 is a conceptual diagram showing two bridge wires connected to the heater of FIG. 13.

FIG. 16 is a conceptual diagram showing two bridge wires connected to the heater of FIG. 13.

Referring to FIG. 16, two bridge wires 510' and 520' are connected to the heater in a case where the electrode patterns 423a and 423b formed on the green sheet 423 only include heater patterns. The bridge wires 510' and 520' are respectively connected to a (+) pole and a (−) pole of the power source.

Figure 17:
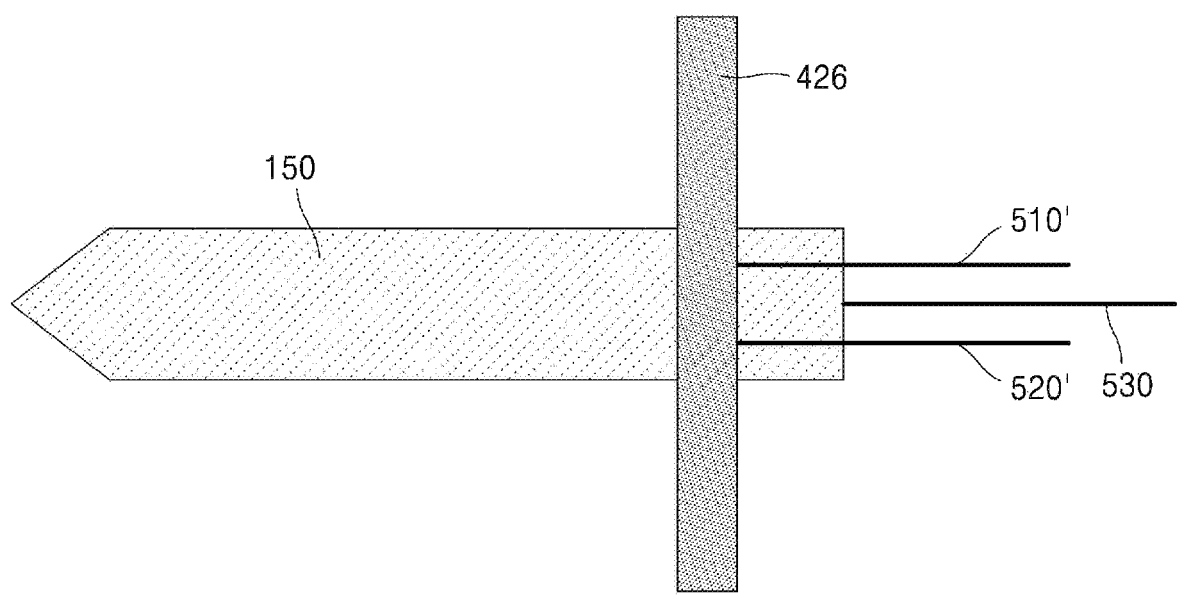
FIG. 17 is a conceptual diagram showing three bridge wires connected to the heater of FIG. 13.

FIG. 17 is a conceptual diagram showing three bridge wires connected to the heater of FIG. 13.

Referring to FIG. 17, three bridge wires 510', 520', and 530 are connected to the heater when the electrode patterns 423a and 423b (see FIG. 4) formed on the green sheet 423 (see FIG. 4) include the heater electrode pattern 423a (see FIG. 4) and the sensor electrode pattern 423b (see FIG. 4). The three bridge wires 510', 520', and 530 are respectively connected to the heater electrode pattern 423b (see FIG. 4), the sensor electrode pattern 423b, and a ground.

Figure 18:
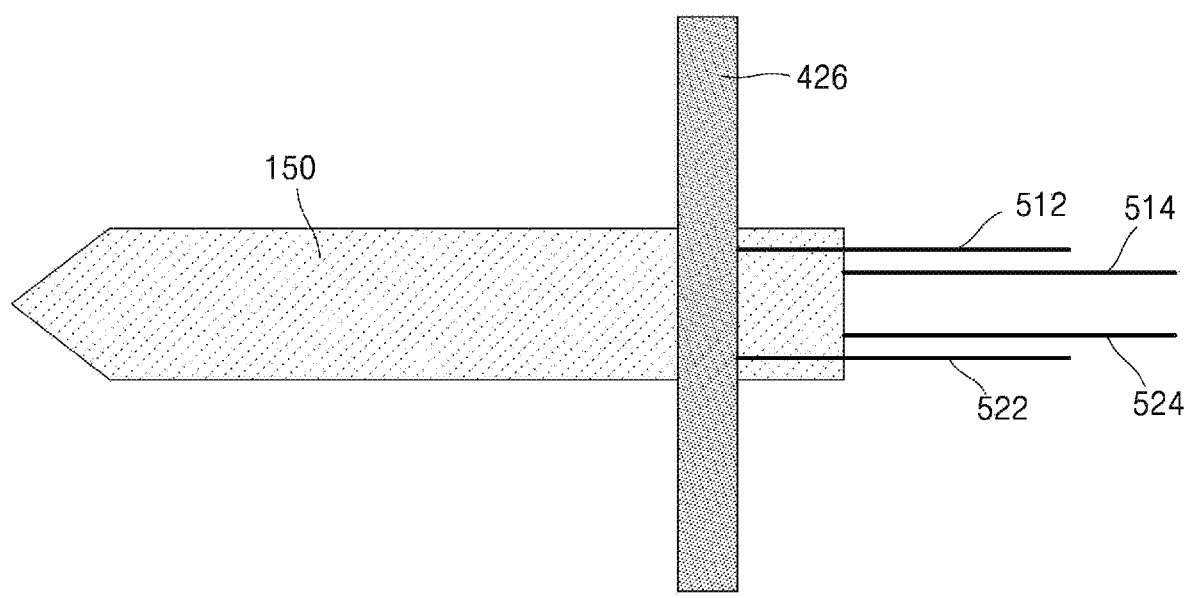
FIG. 18 is a conceptual diagram showing four bridge wires connected to the heater of FIG. 13.

FIG. 18 is a conceptual diagram showing four bridge wires connected to the heater of FIG. 13.

Referring to FIG. 18, four bridge wires 512, 514, 522, and 524 are connected to the heater when the electrode patterns 423a and 423b (see FIG. 4) formed on the green sheet 423 (see FIG. 4) include the heater electrode pattern 423a (see FIG. 4) and the sensor electrode pattern 423b (see FIG. 4). The four bridge wires 512, 514, 522, and 524 respectively include the bridge wires 512 and 514 of (+) and (−) poles connected to the heater electrode pattern 423a (see FIG. 4) and the bridge wires 522 and 524 of (+) and (−) poles connected to the sensor electrode patterns 423b (see FIG. 4).

The bridge wires 510', 520', 530, 512, 514, 522, and 524 may include one or more selected from Ni, Pt, W, Al, Ag, Au, Kanthal-based alloy, and stainless steel.

Figure 19:
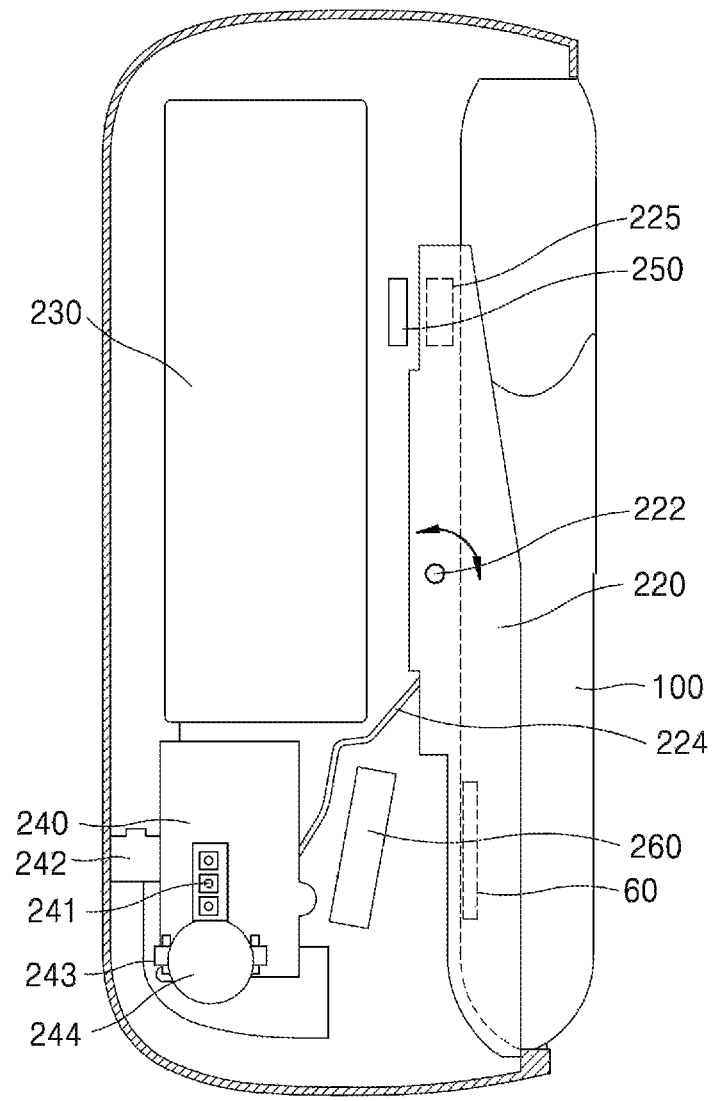
FIG. 19 is a conceptual diagram of a first operating example of a charging system of FIG. 1.

FIG. 19 is a conceptual diagram of a first operating example of a charging system of FIG. 1.

Referring to FIG. 19, the external power supply device 200 include cases 210 that may be separated from each other, and each of the cases 210 have a partitioned inside so that elements of the external power supply device 200 may be mounted, and also include a plurality of hooks 211 and hook recesses 212 to be coupled to each other.

The charging accommodation portion 220 is installed to be rotatable in the case 210 and accommodates the aerosol generating apparatus 100 to be detachable. The charging accommodation portion 220 include a hinge 222 via a hole 221 formed in each side surface and insert the hinge 222 to a concave recess 214 formed in the case 210 to be installed rotatably with respect to the case 210.

Also, a side of the charging accommodation portion 220, which faces the aerosol generating apparatus 100, may have a shape corresponding to an outer appearance of the aerosol generating apparatus 100 in order to stably accommodate the aerosol generating apparatus 100. In addition, the auxiliary power storage device 230 and the auxiliary power supply device 240 are connected via wires, and the auxiliary power supply device 240 is connected to a charging terminal 223 formed in the charging accommodation portion 220 via a wire 224.

The auxiliary power storage device 230 stores power to be transferred to the aerosol generating apparatus 100, and the auxiliary power supply device 240 controls the auxiliary power storage device 230 to supply the power to the aerosol generating apparatus 100. The auxiliary power storage device 230 and the auxiliary power supply device 240 may be mounted in an accommodation portion 213 of the external power supply device 200.

The auxiliary power supply device 240 controls the auxiliary power storage device 230 to be charged by a general external power source built in a case such as a universal serial bus (USB) port 242, and displays a charging status of the auxiliary power storage device 230 through a light-emitting diode (LED) 241.

For example, the LED 241 includes three LEDs so as to turn on one LED, two or three LEDs according to the charged amount, and when the three LEDs are turned on, the auxiliary power storage device 230 is at the maximum charging status.

Each LED in the LED 241 may be turned on to outside of the case through a hole 215 provided in the case 210 that is coupled to the case 210 in which the LED 241 is mounted. Also, the case 210 includes a second button portion 243 protruding out of the case 210 through a hole 215, and the second button portion 243 is supported by a fixing protrusion 244 in the case 210.

The second button portion 243 is connected to the auxiliary power supply device 240 via wires. In addition, when the user manipulates the second button portion 243, an activation signal is transferred to the auxiliary power supply device 240 to allow the auxiliary power storage device 230 to supply the power to the aerosol generating apparatus 100, and when the user manipulates the second button portion 243 again while the auxiliary power storage device 230 supplies the power to the aerosol generating apparatus 100, the power supply from the auxiliary power storage device 230 to the aerosol generating apparatus 100 may be blocked.

For example, as shown in FIG. 19, in a state where the aerosol generating apparatus 100 is attached to the charging accommodation portion 220 and the charging accommodation portion 220 is located in parallel with a lengthwise direction of the case 210, when the user pushes the second button portion 243, the auxiliary power supply device 240 allows the auxiliary power storage device 230 to allow the power to the aerosol generating apparatus 100 to operate the aerosol generating apparatus 100 in a cleaning mode, in which the aerosol generating apparatus 100 is cleaned by melting ash or impurities on the aerosol generating apparatus 100.

In detail, a signal of manipulating the second button portion 243 by the user is transferred from the auxiliary power supply device 240 to the controller 50 of the aerosol generating apparatus 100 via the charging terminal 223 of the charging accommodation portion 220 and the charging terminal 30 of the aerosol generating apparatus 100, and operates the heater 20 of the aerosol generating apparatus 100.

That is, even when the first button portion 40 of the aerosol generating apparatus 100 is not manipulated, the heater 20 of the aerosol generating apparatus 100 may be operated by manipulating the second button portion 243 of the external power supply device 200 in a state where the aerosol generating apparatus 100 is mounted in the charging accommodation portion 220 and the charging accommodation portion 220 is located in parallel with the lengthwise direction of the case 210.

Figure 20:
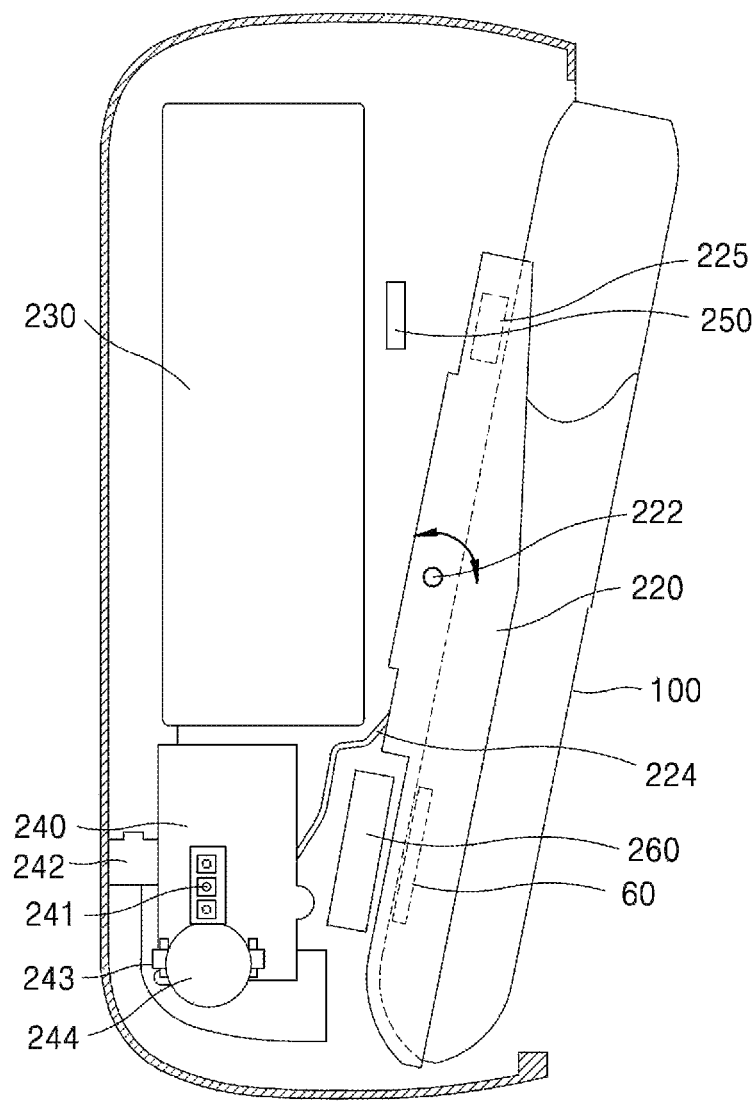
FIG. 20 is a conceptual diagram of a second operating example of the charging system of FIG. 1.
Figure 21:
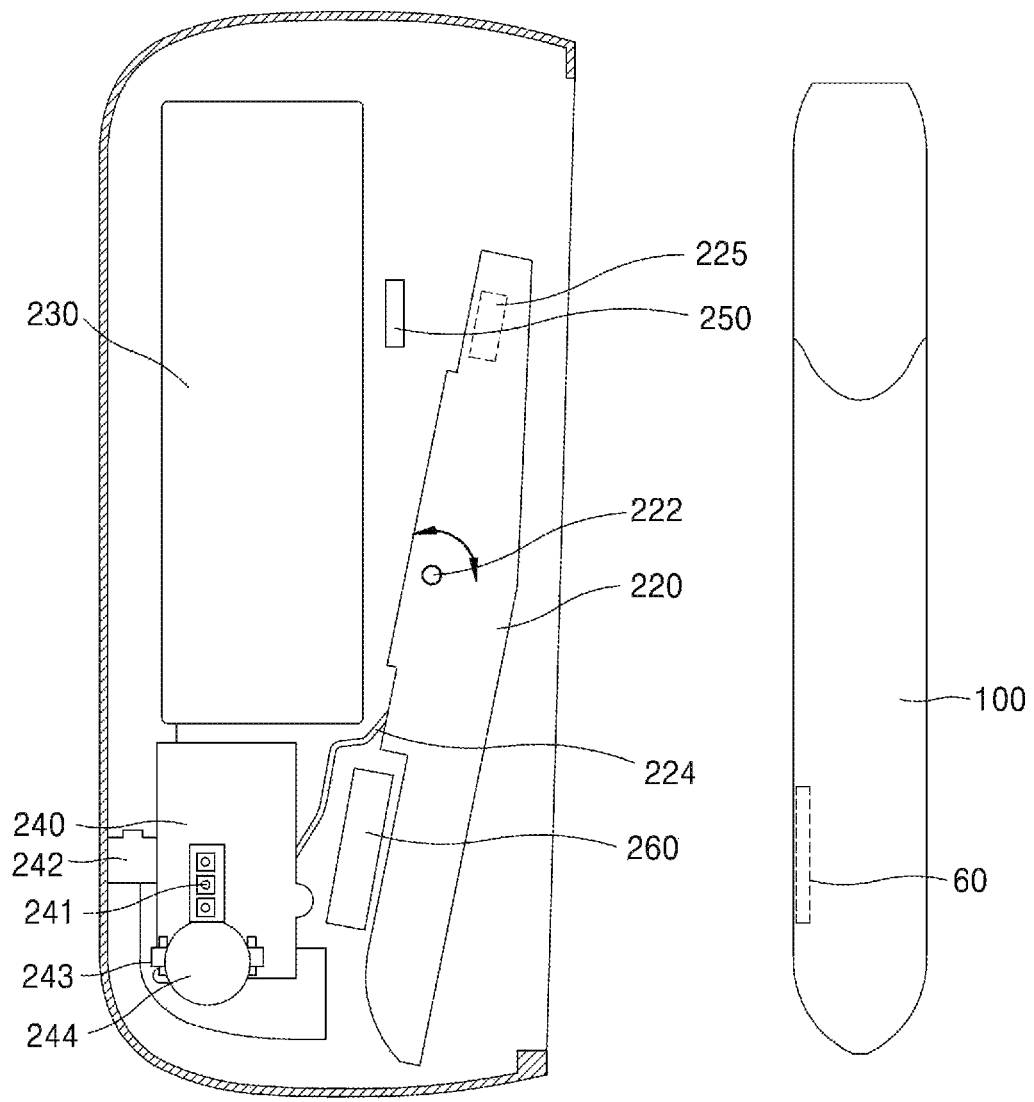
FIG. 21 is a conceptual diagram of a third operating example of the charging system of FIG. 1.

FIG. 20 is a conceptual diagram showing a second operating example of the charging system of FIG. 1, and FIG. 21 is a conceptual diagram showing a third operating example of the charging system of FIG. 1.

In addition, as shown in FIG. 20, in a state where the aerosol generating apparatus 100 is attached to the charging accommodation portion 220 and the charging accommodation portion 220 is located to cross a lengthwise direction of the case 210, when the user pushes the second button portion 243, the auxiliary power supply device 240 allows the auxiliary power storage device 230 to allow the power to the aerosol generating apparatus 100 to operate the aerosol generating apparatus 100 in a pre-heating mode, in which the aerosol generating apparatus 100 is pre-heated.

That is, the charging terminal 223 of the charging accommodation portion 220 is connected to the charging terminal 30 of the aerosol generating apparatus 100 to face the charging terminal 223, in a state where the aerosol generating apparatus 100 is accommodated in the charging accommodation portion 220, and the power charged in the auxiliary power storage device 230 may be supplied to the aerosol generating apparatus 100 according to control of the auxiliary power supply device 240. The auxiliary power supply device 240 includes a wireless communication port so as to supply the power wirelessly to the aerosol generating apparatus 100, as well as through wires.

For example, when the user manipulates the second button portion 243 to transfer an activation signal to the auxiliary power supply device 240, the power supply from the auxiliary power storage device 230 to the aerosol generating apparatus 100 is allowed and the heater 20 of the aerosol generating apparatus 100 may be heated. On the contrary, when the user manipulates the second button portion 243 while the heater 20 is heated, a deactivation signal is transferred to the auxiliary power supply device 240 and the power supply from the auxiliary power storage device 230 to the aerosol generating apparatus 100 may be blocked.

Also, the case 210 includes a first magnetic body 250 and a second magnetic body 260 that are arranged to be symmetric with each other about a rotating center, that is, the hinge 222. In addition, the charging accommodation portion 220 include a third magnetic body 225 facing one of the first magnetic body 250 and the second magnetic body 260. In the drawings, the third magnetic body 225 faces the first magnetic body 250, but one or more embodiments are not limited thereto, that is, the third magnetic body 225 may be provided at a lower end of the charging accommodation portion 220 to face the second magnetic body 260. However, for the convenience of description, a case in which the third magnetic body 225 is provided at an upper end of the charging accommodation portion 220 to face the first magnetic body 250 will be described below.

Also, one of the first magnetic body 250 and the second magnetic body 260 may be installed on the case 210 to be inclined with respect to the lengthwise direction of the case 210. In the drawings, the second magnetic body 260 that is provided at the lower side of the external power supply device 200 is installed on the case 210 to be inclined with respect to the lengthwise direction of the case 210, but one or more embodiments are not limited thereto, that is, the first magnetic body 250 may be installed on the case 210 to be inclined with the lengthwise direction of the case 210. Hereinafter, for convenience of description, a case in which the second magnetic body 260 is inclined with respect to the lengthwise direction of the case 210 will be described below.

Also, the aerosol generating apparatus 100 may include a fourth magnetic body 60 that faces one of the first magnetic body 250 and the second magnetic body 260, which does not face the third magnetic body 225.

In summary, the first magnetic body 250 and the second magnetic body 260 are provided respectively on the upper and lower ends of the case 210 of the external power supply device 200, the third magnetic body 225 facing the first magnetic body 250 may be provided on the upper end of the charging accommodation portion 220 and the fourth magnetic body 60 facing the second magnetic body 260 may be provided on the lower end of the aerosol generating apparatus 100.

Here, a magnetic force may be applied between the first magnetic body 250 and the third magnetic body 225, between the first magnetic body 250 and the fourth magnetic body 60, between the second magnetic body 260 and the third magnetic body 225, and between the second magnetic body 260 and the fourth magnetic body 60.

Therefore, according to the above structure, when the user presses the upper end of the aerosol generating apparatus 100 in a state where the aerosol generating apparatus 100 is mounted in the charging accommodation portion 220, the charging accommodation portion 220 may be arranged in parallel with the lengthwise direction of the case 210 as shown in FIG. 3 due to the magnetic force between the first magnetic body 250 and the third magnetic body 225.

In addition, in a state where the aerosol generating apparatus 100 is mounted in the charging accommodation portion 220 as shown in FIG. 10, when the user presses the lower end of the aerosol generating apparatus 100 with a power that may overcome the magnetic force between the first magnetic body 250 and the third magnetic body 225, the charging accommodation portion 220 rotates in a clockwise direction as shown in FIG. 11 and the charging accommodation portion 220 may be arranged in a direction crossing the lengthwise direction of the case 210 due to the magnetic force generated between the third magnetic body 225 and the fourth magnetic body 60.

Since the second magnetic body 260 is provided on the case 210 to be inclined with respect to the lengthwise direction of the case 210, the aerosol generating apparatus 100 may tilt to correspond to the inclination angle of the second magnetic body 260 within the external power supply device 200.

After that, the user presses the tilted aerosol generating apparatus 100 with a power that is greater than the magnetic force between the second magnetic body 260 and the fourth magnetic body 60, and then, the aerosol generating apparatus 100 may be separated from the external power supply device 200 as shown in FIG. 12.

Figure 22:
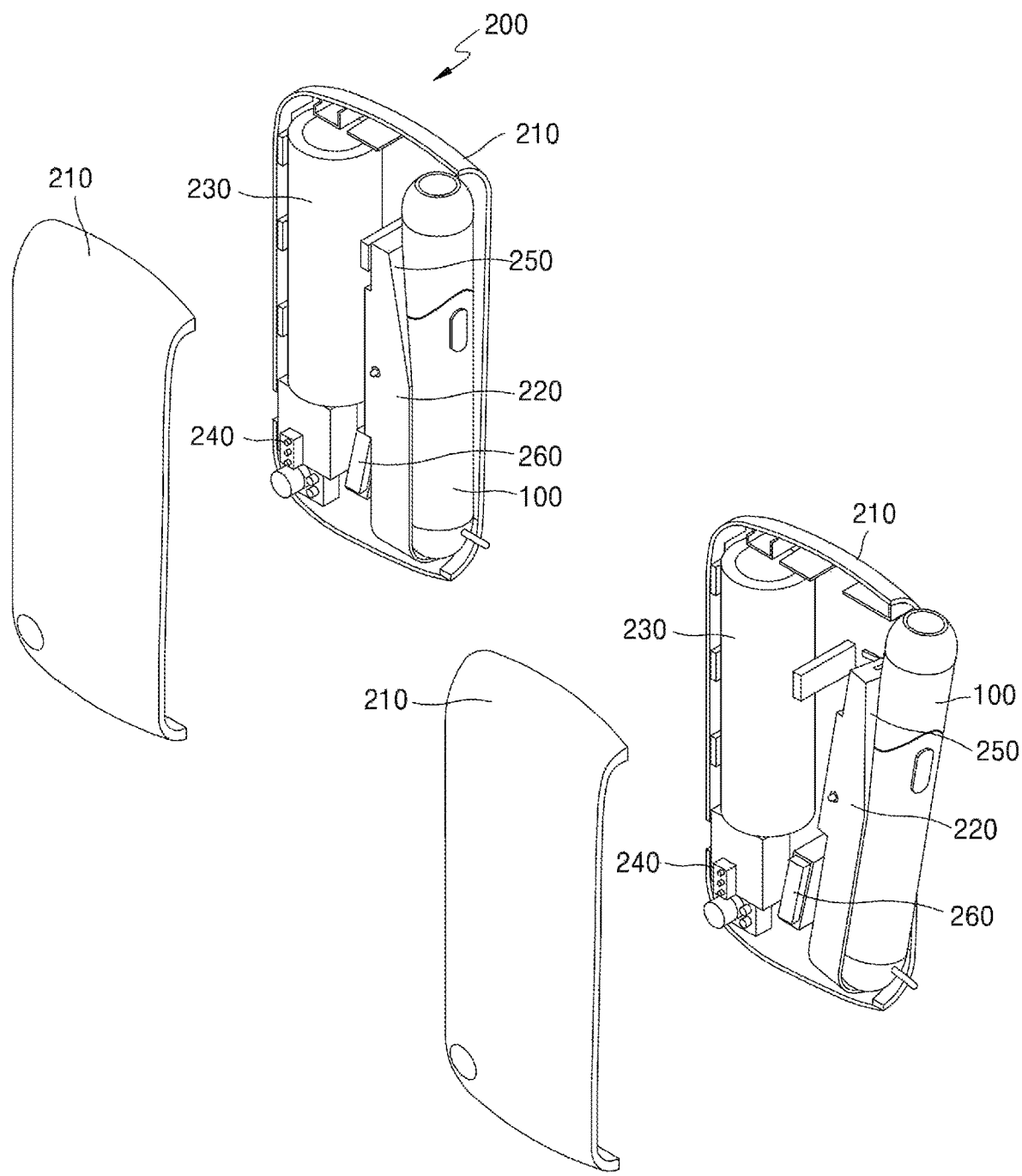
FIG. 22 is an exploded perspective view showing a status in which the aerosol generating apparatus of FIG. 1 is available in a state of being accommodated in an external power supply device.

FIG. 22 is an exploded perspective view showing a status in which the aerosol generating apparatus of FIG. 1 is available in a state of being accommodated in an external power supply device.

Referring to FIG. 22, the aerosol generating apparatus 100 may receive the power supply while being mounted in the charging accommodation portion 220 of the external power supply device 200. When the user wants to use the aerosol generating apparatus 100, the lower end of the aerosol generating apparatus 100 is pushed in a state where the aerosol generating apparatus 100 is accommodated in the charging accommodation portion 220 of the external power supply device 200 by the fourth magnetic body 60, and then, the charging accommodation portion 220 is adhered to the second magnetic body 260 inclined at a predetermined angle in the case 210 due to the fourth magnetic body 60 included in the aerosol generating apparatus 100 in a state where the aerosol generating apparatus 100 is accommodated in the charging accommodation portion 220.

According to the above manipulation, an upper portion of the aerosol generating apparatus 100 is partially exposed to outside in a state where the aerosol generating apparatus 100 is inclined a predetermined angle to the outer portion of the case 210, and the user inserts the cigarette into the cartridge 10 of the aerosol generating apparatus 100, which is exposed outside, and pushes the second button portion 243 of the external power supply device 200 to pre-heat the aerosol generating apparatus 100.

Therefore, the aerosol generating apparatus 100 may be continuously used while receiving the electric power from the charging system 1000.

FIG. 23 is a perspective view showing a process of separating the aerosol generating apparatus of FIG. 1 from the external power supply device.

Referring to FIG. 23, when the user separates the aerosol generating apparatus 100 from the external power supply device 200, as described above, the user presses the aerosol generating apparatus 100 in a state where the aerosol generating apparatus 100 is inclined and partially exposed from the external power supply device 200 to withdraw the aerosol generating apparatus 100 overcoming the magnetic force between the aerosol generating apparatus 100 and the external power supply device 200.

The disclosure is not limited to the embodiments described above, and one of ordinary skill in the art, without departing from the subject matter of the disclosure claimed in claims, would carry out various modifications and such modifications are within the scope of the claims.

In addition, the terms such as " . . . unit", etc. provided herein may be realized by a hardware component such as a processor or a circuit, and/or a software component executed via a hardware component such as a processor.

The above description of the disclosure is provided for the purpose of illustration, and it would be understood by those skilled in the art that various changes and modifications may be made without changing technical conception and essential features of the disclosure. Thus, the embodiments set forth herein or shown above are to be interpreted in an illustrative and non-limiting sense. For example, each component described to be of a single type can be implanted in a distributed manner. Likewise, components described to be distributed can be implanted in a combined manner.

The scope of the disclosure is defined by the following claims rather than by the detailed description of the embodiment. It shall be understood that all modifications and embodiments conceived from the meaning and scope of the claims and their equivalents are included in the scope of the disclosure.

While the disclosure has been particularly shown and described with reference to exemplary embodiments thereof, it will be understood by those of ordinary skill in the art that various changes in form and details may be made therein without departing from the spirit and scope as defined by the following claims. Therefore, the scope sought to be protected of the disclosure shall be defined by the appended claims.

INDUSTRIAL APPLICABILITY

According to an aerosol generating apparatus, a method of controlling the aerosol generating apparatus, and a charging system including the aerosol generating apparatus of one or more embodiments, the aerosol generating apparatus capable of vaporizing an aerosol generating material without being accompanied by combustion may be implemented.

The invention claimed is:

1. An aerosol generating apparatus comprising:
a main body into which a cigarette is to be inserted;
a first electrically conductive pattern provided on a portion of the main body and configured to switch between a heater mode for heating the cigarette and a temperature sensor mode for sensing a temperature of the cigarette;
a second electrically conductive pattern provided on another portion of the main body and configured to switch between the heater mode and the temperature sensor mode; and
a controller configured to control the first electrically conductive pattern and the second electrically conductive pattern to operate in one of the heater mode and the temperature sensor mode,
wherein the controller is further configured to control the first electrically conductive pattern and the second electrically conductive pattern to operate alternately in the heater mode and the temperature sensor mode such that:
in a first case, the first electrically conductive pattern is controlled to operate in the heater mode while the second electrically conductive pattern is controlled to operate in the temperature sensor mode, and
in a second case, the second electrically conductive pattern is controlled to operate in the heater mode while the first electrically conductive pattern is controlled to operate in the temperature sensor mode.

2. The aerosol generating apparatus of claim 1, wherein the controller is further configured to control the first electrically conductive pattern and the second electrically conductive pattern to operate in the heater mode simultaneously.

3. The aerosol generating apparatus of claim 1, wherein the controller is further configured to sense the temperature of the cigarette based on a thermal resistance of at least one of the first electrically conductive pattern and the second electrically conductive pattern.

4. The aerosol generating apparatus of claim 1, wherein the second electrically conductive pattern comprises an electrode that overlaps an electrode of the first electrically conductive pattern in a direction perpendicular to an extending direction of the main body, with the main body therebetween.

\* \* \* \* \*